United States Patent
Groteke

(10) Patent No.: US 6,464,929 B1
(45) Date of Patent: *Oct. 15, 2002

(54) DROSS PROCESSING SYSTEM

(75) Inventor: Daniel E. Groteke, St. Joseph, MI (US)

(73) Assignee: Q. C. Designs, Inc., Saint Joseph, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/654,314

(22) Filed: Sep. 1, 2000

(51) Int. Cl.$^7$ .................................. C21C 5/32
(52) U.S. Cl. .................. 266/205; 266/227; 266/275
(58) Field of Search .............................. 266/205, 227, 266/44, 232, 275

(56) References Cited

U.S. PATENT DOCUMENTS

| | | | |
|---|---|---|---|
| 3,198,505 A | 8/1965 | Amdur et al. ............... | 266/205 |
| 4,121,810 A | 10/1978 | Lui et al. ..................... | 266/201 |
| 4,440,640 A * | 4/1984 | Groteke et al. ............. | 210/237 |
| 5,906,790 A * | 5/1999 | Bramley ..................... | 266/205 |
| 6,136,262 A * | 10/2000 | Groteke ....................... | 266/165 |
| 6,197,250 B1 * | 3/2001 | Bramley ..................... | 266/227 |
| 6,235,234 B1 * | 5/2001 | Hennessy et al. ............. | 266/44 |

FOREIGN PATENT DOCUMENTS

JP        51-66213        6/1976        ................... 75/672

* cited by examiner

*Primary Examiner*—Scott Kastler
(74) *Attorney, Agent, or Firm*—Michael J. Weins; Jeffrey E. Semprebon

(57) ABSTRACT

A dross processing system has a substantially vertical support positioned in close proximity to a furnace. A reaction vessel is mounted to the substantially vertical support by a reaction vessel support. The reaction vessel preferably has a substantially vertical sidewall and a bottom member having a sealable port. The reaction vessel is preferably fabricated of stainless steel sheet stock, and can have expanded metal sheet welded to the outside or can have a dual-shell structure. The reaction vessel is retained in a horizontal position for loading metal-bearing dross, and can pivot to dump spent dross. The reaction vessel support can be rotatably mounted with respect to the furnace to allow the reaction vessel to be swung away from the furnace for dumping. In one embodiment, the reaction vessel can also be raised and lowered. A motor having a drive shaft with a free end is connected to a motor arm which in turn is mounted with respect to the substantially vertical support such that the motor can be raised or lowered. Preferably the motor can be translated and can be secured in multiple lowered positions. An impeller attaches to the free end of the drive shaft and is positioned below the upper rim of the reaction vessel when the motor is in its lowered position. A protective shield which engages the upper rim of the reaction vessel to contain fumes when the motor is in its lowered position is preferably also provided.

20 Claims, 15 Drawing Sheets

DROSS PROCESSING SYSTEM

FIELD OF THE INVENTION

The present invention relates to a system for processing dross which forms on a molten metal bath during melting and holding in a furnace and more particularly to a system for reclaiming metal entrapped in the dross.

BACKGROUND OF THE INVENTION

Various techniques have been developed for reclaiming metals from drosses to reduce metal losses associated with melting and holding molten metal in a furnace. One technique has been to transport the dross to a site remote from the furnace site for processing. A second technique processes the dross at the furnace site. These techniques frequently employ a reaction vessel where the dross is stirred or agitated to promote separation of the metal entrapped therein. During processing, the entrapped metal forms a pool of molten metal at the bottom of the reaction vessel. The molten metal is then drained from the bottom of the reaction vessel into a collection vessel, and the spent dross is dumped from the reaction vessel.

U.S. Pat. No. 3,198,505 illustrates an apparatus used for remote processing of the dross. This apparatus includes a frame to which a motor-driven stirrer is mounted. A drum is employed as a reaction vessel for containing the dross. The reaction vessel is designed to be transported by forklift from the furnace site, where the dross is loaded into the reaction vessel, to a remote site where the frame is located. A movable platform is provided to raise the drum so as to immerse the stirrer into the dross in the drum. A recovery tray resides below the platform to collect the drained metal. This apparatus requires dedicated space, making it impractical for use where free space to accommodate the apparatus is not available. The remote processing of the dross also introduces temperature losses during transport of the dross and can complicate the effective processing of the dross.

U.S. Pat. No. 4,121,810 illustrates an in situ apparatus which can be effectively used for processing larger volumes of dross. The '810 patent discloses a container with a motorized stirrer which extends through the bottom of the container. The container is mounted on a wheeled carriage to allow positioning it near a furnace for loading dross, thus avoiding the need for a dedicated space. Trunnions are provided to allow pivoting the container to dump the remaining dross after the metal has been drained. A frusto-conical shield in the bottom of the container protects the bearing of the stirrer drive shaft from the dross and the molten metal. The drive shaft is driven via a chain by a motor, which is apparently mounted to the side of the container to allow the container to be tipped without disengaging the drive mechanism. The requirements of shielding the drive bearing and mounting the motor to the container complicate the structure of the container, and make replacement of such a container impractical. While the system of the '810 patent is mobile, it is complex, making it difficult to maintain, and makes the elimination of the spent dross difficult.

U.S. patent application Ser. No. 09/233,564, now issued as U.S. Pat. No. 6,136,262, the inventor has disclosed and claimed an apparatus suitable for in situ processing which provides a mobile apparatus with reduced complexity; however, such does not provide for automated stirring, which effectively limits the quantity of dross that can be conveniently processed since it relies on the operator stirring the dross. Furthermore, the effectiveness of such apparatus is dependent on the skills of the operator. Also, for larger volumes of dross, the operator is required to stir the dross for a substantial time and may choose to foreshorten the cycle since, while stirring, the operator is working in close proximity to the hot dross and is exposed to fumes which are generated as the dross reacts with exothermic compounds and fluxes employed to enhance the recovery of the entrapped metal.

Thus, there is a need for a dross processing system which avoids the disadvantages of the devices discussed above and which is simple to operate, requires minimum maintenance, and yet provides a high recovery rate.

SUMMARY OF THE INVENTION

The present invention is for an in situ dross processing system for reclaiming entrapped metal from a dross. The in situ dross processing system of the present invention reclaims entrapped metal from the dross which develops while melting metal and holding the molten metal in a furnace. The system of the present invention has been found to have particular utility in processing the dross associated with molten aluminum alloys.

In an elementary form, the dross processing system has a substantially vertical support and means for positioning the support in close proximity to the furnace. The substantially vertical support terminates in an upper support region and a lower support region. In one embodiment, the means for positioning the support is a bracket affixed to the furnace and engaging the lower support region, while in another embodiment a stand is attached to the lower support region and serves to position the substantially vertical support in close proximity to the furnace. The stand can be designed to either anchor the substantially vertical support with respect to the furnace or can be mounted on wheels to facilitate the movement of the dross processing system to and from a position in close proximity to the furnace.

A reaction vessel is provided, into which the dross is loaded and processed to extract molten metal entrapped therein and separate it therefrom, by allowing the molten metal to settle to the bottom of the reaction vessel. The reaction vessel preferably has a substantially vertical sidewall, terminating in an upper rim and a lower rim, and a bottom member attached to the lower rim so as to form a concave surface when viewed from the sidewall. Some limited degree of draft is preferred in the substantially vertical sidewall to better facilitate dumping the contents of the reaction vessel. Furthermore, having draft in the substantially vertical sidewall, in combination with the bottom member having a concave surface promotes relief of the resulting stress field from thermal expansion by axial symmetric strains and prevents local buckling even when the reaction vessel is fabricated of relatively thin stock.

A port is located in the bottom of the reaction vessel and is preferably formed by a cylindrical sleeve passing through the bottom member. The port is configured to be sealingly engaged by a port plug, which is preferably fabricated from a refractory fiber material such as an alumino silicate that is packed into the port to seal the port and avoid run-out of the molten metal collected in the bottom of the reaction vessel. It is further preferred that a removable plug support plate be positioned below the sleeve and maintained in position by a plate support rack attached to the bottom of the reaction vessel. The plug support plate provides additional support to the plug to withstand the pressure from the head of recovered metal which collects in the bottom of the reaction vessel. It is further preferred that the plate support rack have two substantially horizontal members which attach to the reaction vessel and on which the support a plate slidably rests. In a preferred embodiment, the two substantially horizontal members are formed as U-shaped plate support bars on which the plug support plate rests.

The dross processing system may be configured such that the reaction vessel can reside over the furnace for loading the dross. In such cases, it is preferred that the reaction vessel be fabricated of metal sheet stock. For processing dross from aluminum alloys, a low alloy stainless steel such as 304 stainless steel has been found adequate for forming the metal reaction vessel. For ease in fabrication, it is preferred that the reaction vessel be fabricated from a multiple part assembly having a substantially vertical sidewall, which can be readily formed from metal sheet stock, to which a bottom member is attached. The bottom member can be readily formed by spinning metal sheet stock into a dish shape which is then welded to the substantially vertical sidewall. The spun metal sheet stock is provided with a hole, into which is welded a cylindrical sleeve which serves as a port. While a 304 stainless steel is adequate for processing drosses of aluminum alloys when the reaction vessel is so fabricated, it is preferred that a higher alloy stainless steel such as 310 stainless steel be employed for the bottom member and the substantially vertical sidewall. However, in any case, it has been found practical to form the cylindrical sleeve from low carbon steel. It has been found that the substantially vertical sidewall, the bottom member, and the cylindrical sleeve can be effectively joined by MIG welding with a filler metal selected to avoid sensitization of the weld and heat-affected zone during fabrication and use. ER309 stainless steel has been found adequate as such a filler metal, but ER310 stainless steel is preferred.

The use of a metal reaction vessel allows the reaction vessel to be preheated when residing above the furnace by the radiant energy from the molten metal contained therein. To optimize such pre-heating, the reaction vessel preferably has minimal thermal mass. To decrease the thermal mass while maintaining the structural integrity of the reaction vessel, a thin gauge metal can be used for the reaction vessel, reinforced by an expanded metal sheet tack welded to the outside of the reaction vessel.

For applications where the dross processing system has the reaction vessel at all times positioned outside the footprint of the furnace, a dual shell reaction vessel is preferred. Preferably, this reaction vessel is fabricated from metal sheet stock and has an inner substantially vertical sidewall spaced apart from an outer substantially vertical sidewall, both of which attach to a common upper rim. The inner substantially vertical sidewall terminates in an inner lower rim which is separate and spaced apart from an outer lower rim which terminates the outer substantially vertical sidewall. For such a reaction vessel, again an inner bottom member can be spun from metal sheet stock and welded to the inner lower rim to form an inner shell. Similarly, an outer bottom member can be spun from metal sheet stock and welded to the outer lower rim, which is positioned with respect to the inner lower rim such as to maintain a spaced-apart relationship between the inner bottom member and the outer bottom member, thus forming an outer shell. In the dual shell reaction vessel, a sleeve passes through both the inner bottom member and the outer bottom member, and serves as a port through which reclaimed metal from the dross is drained. The sleeve also provides additional structural rigidity to the reaction vessel. Greater strength may be provided by placing a refractory material such as Fiberfrax Blanket refractory fibers between the inner shell and the outer shell.

When the dross processing system is not designed to have the reaction vessel reside over the molten metal, a dual shell reaction vessel can also be fabricated having an inner shell fabricated from metal sheet stock, which has an expanded metal framework attached thereto, and an outer shell which is fabricated from refractory materials applied over the expanded metal framework. The use of refractory materials reduces heat loss from the dross held therein without providing a second metal shell which is spaced apart from the first shell.

For the embodiments of the in situ dross processing system of the present invention, a reaction vessel support mounts the reaction vessel with respect to the substantially vertical support. The reaction vessel is mounted to the reaction vessel support by a reaction vessel mount, which can be an integral part of the reaction vessel support and which pivotably attaches the reaction vessel to the reaction vessel support. Means are provided for retaining the reaction vessel in a horizontal position, where the upper rim of the reaction vessel is substantially horizontal. Means to pivot the reaction vessel are provided to pivot the reaction vessel to a dump position where the contents of the reaction vessel are eliminated. Mechanical means for such can be provided by a linear actuator attached between the reaction vessel and the reaction vessel support, by a counterweight system in combination with hand raising, by a motor in combination with appropriate gearing, or by configuring the reaction vessel mount such that the reaction vessel pivots to the dump position under the influence of gravity. When the substantially vertical support is affixed with respect to the furnace or cannot be readily moved with respect to the furnace and the reaction vessel resides over the furnace, the reaction vessel support is rotatably mounted with respect to the furnace about a vertical axis to allow the reaction vessel to be swung away from the furnace for dumping. When swung away from the furnace, the reaction vessel resides outside the footprint of the furnace, making it accessible to the user so that its contents can be readily eliminated, and the reaction vessel inspected and made ready for its next cycle. In such instances it is also preferred that the reaction vessel support can be raised and lowered such that its height can be adjusted so as to allow the reaction vessel to be readily swung to a position outside the footprint of the furnace and, when so positioned, lowered to facilitate loading of the vessel.

A motor having a drive shaft with a free end is connected to a motor arm which in turn is mounted with respect to the substantially vertical support such that the motor is positionable with respect to the reaction vessel. The motor is raisable and lowerable with respect to the reaction vessel. The motor is preferably also rotatable to a position where a footprint of the motor does not project onto the reaction vessel. This latter motion is advantageous in allowing the motor to be swung away from the reaction vessel to assist in the loading of the reaction vessel with dross to be processed.

A motor mount, which can be an integral part of the motor arm, secures the motor with respect to the motor arm such that the drive shaft is positioned in a substantially vertical orientation with the free end of the drive shaft directed toward the reaction vessel when the motor resides above the reaction vessel.

The dross processing system is provided with means for displacing the motor with respect to the reaction vessel, thus moving the motor between a raised position and at least a first lowered position which places the motor into relatively close proximity to the reaction vessel. When the means for displacing the motor provide translational motion of the motor, typical examples of such means include the use of linear actuators, rack and pinion gearing, and counterweight systems. Alternatively, the means for displacing the motor can provide a pivotable motion of the motor with respect to the reaction vessel.

When the means for displacing the motor provide translational motion of the motor, it is further preferred that means for securing the motor in the at least a first lowered position and in the raised position be provided. When a linear actuator is employed as the means displacing the motor, the linear actuator can be configured to cycle from a full extension position to a minimum extension position and can serve the dual functions of positioning and securing the motor. When a counterweight system is employed to balance the weight of the motor and associated structure and the motor is manually raised and lowered, a slot and key can be used to guide the movement of the motor and lock it at the appropriate locations.

A stirrer is provided to stir the dross and promote the reaction of the dross with an exothermic compound which is added to the dross to raise the temperature of the dross and promote the coalescence of the metal entrapped therein. The stirrer attaches to the free end of the drive shaft and is mounted such that the stirrer is positioned below the upper rim of the reaction vessel when the motor is in its at least a first lowered position, and is positioned outside the reaction vessel when the motor is in its raised position.

It is further preferred that the stirrer be an impeller with a plurality of blades to promote the mixing of the exothermic compound added. The blades can be radially arranged around the drive shaft and extend substantially normally thereto, or alternatively the blades can be mounted on a hub which is normal to the drive shaft, and be arranged in a spaced-apart relationship to each other and in a non-intersecting relationship with the axis of the drive shaft.

It is also preferred for a protective shield to be provided, which is configured to engage the upper rim of the reaction vessel when the motor is in the at least a first lowered position to maintain fumes generated by the reaction of the exothermic with the dross within the confines of the reaction vessel. The protective shield also serves to reduce heat loss from radiation and any splashing of the dross and entrapped metal as the dross is stirred. The protective shield is provided with a drive shaft passage through which the drive shaft of the motor passes.

In another preferred embodiment, means for providing lateral movement of the stirrer in the vessel are provided, which reduces the size of the impeller needed to stir the dross and promote the reaction of the dross with an exothermic compound added thereto.

For embodiments where the stand is mounted on wheels to allow the dross processing system to be readily transported to and from the furnace area and where the reaction vessel will not be positioned over the molten metal bath, it is preferred that the stand also have a platform onto which a spent dross container can be placed. The spent dross container preferably has pivotally and lockably attached thereto a pair of diametrically opposed fork receptors for engagement by the forks of a fork lift to facilitate moving the spent dross container and dumping the spent dross therefrom. Such a spent dross container is also well suited for use with embodiments where the dross processing system is stationary.

BRIEF DESCRIPTION OF THE DRAWINGS

In FIG. 1, the motor is shown in a raised position.

In FIG. 18, the reaction vessel resides above the molten metal bath.

however, the reaction vessel resides outside the footprint of the furnace and has been lowered to facilitate loading dross into the reaction vessel.

BEST MODE OF CARRYING THE INVENTION INTO PRACTICE

Figure 1:
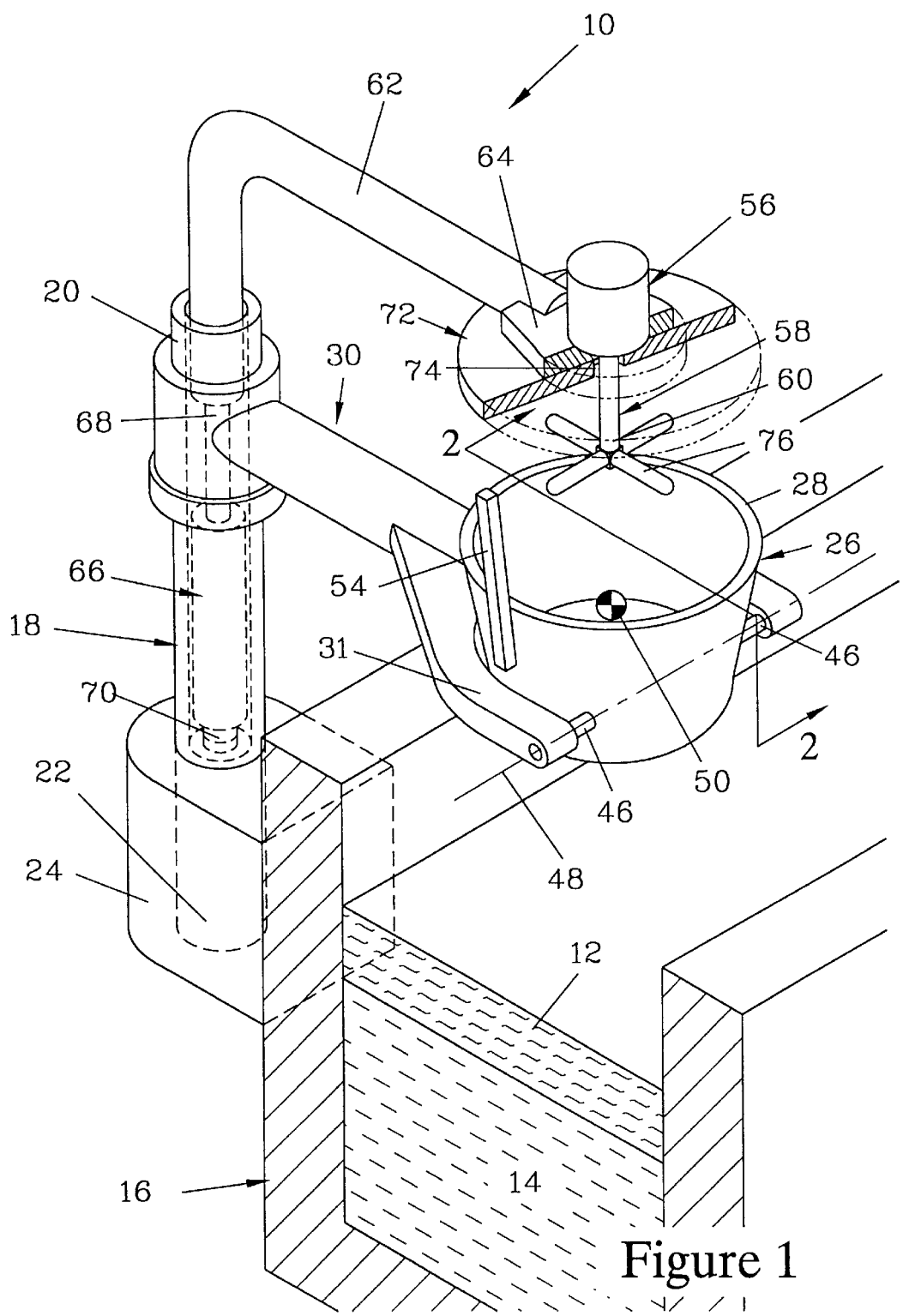
FIG. 1 is an isometric view of one embodiment of a dross processing system of the present invention, which is attached to a furnace by a bracket. This embodiment employs a reaction vessel fabricated from metal sheet stock. A motor used to drive an impeller to stir the dross is raised or lowered by a linear actuator.

FIG. 1 is a schematic representation of one embodiment for a dross processing system 10 of the present invention. The dross processing system 10 is designed to process dross 12 skimmed from a metal melt 14 in a furnace 16. In this embodiment, the dross processing system 10 has a substantially vertical support 18 terminating in an upper support region 20 and a lower support region 22. A bracket 24 is attached to the furnace 16, and engages the lower support region 22 of the substantially vertical support 18.

A reaction vessel 26 is provided having an upper rim 28. The reaction vessel 26 is supported by a reaction vessel support 30 having a reaction vessel mount 31, which can be integral with the reaction vessel support 30. The reaction vessel 26 is pivotally mounted on the reaction vessel support 30. The reaction vessel support 30 in turn is rotatably mounted on the substantially vertical support 18, so that the reaction vessel 26 can be aligned to reside over the metal melt 14 for loading the dross 12. The reaction vessel 26 is fabricated from metal sheet stock.

Figure 2:
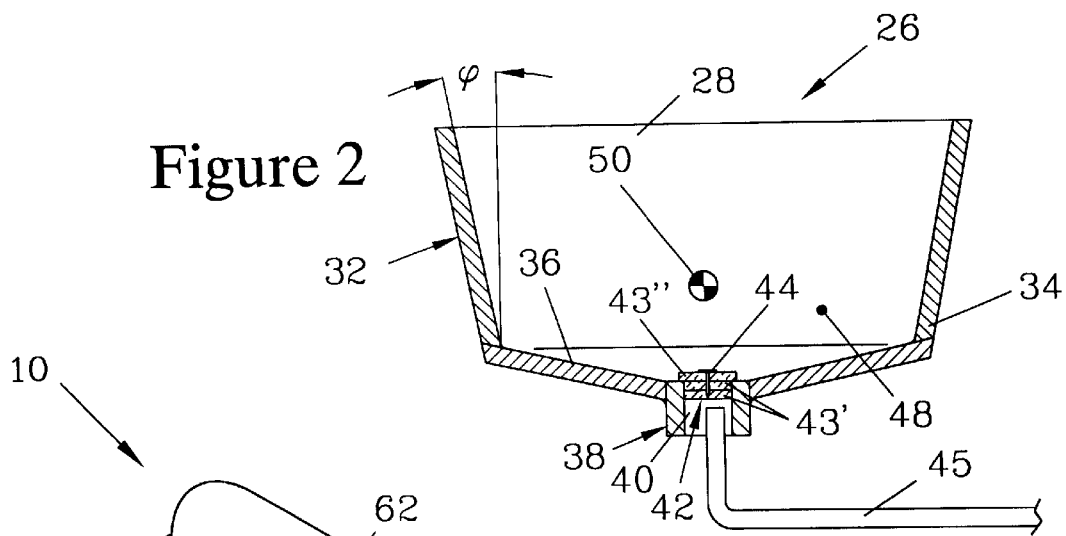
FIG. 2 is a view of the section 2—2 of FIG. 1, illustrating further detail of the reaction vessel and the plug which seals a port in the reaction vessel.

FIG. 2 is a section view which illustrates further details of the construction of the reaction vessel 26 shown in FIG. 1. The reaction vessel 26 has a substantially vertical sidewall 32 formed from metal sheet stock, terminating in the upper rim 28 and in a lower rim 34. The substantially vertical sidewall 32 is preferably provided with a small draft $\Phi$, as shown, to assist in emptying the reaction vessel 26. A bottom member 36, again fabricated from metal sheet stock, is attached to the lower rim 34. The bottom member 36 forms a generally downward sloping surface when viewed from the upper rim 28. A cylindrical sleeve 38 passes through and is attached to the bottom member 36 at the lower extremity, and serves as a port for elimination of molten metal collected therein. The cylindrical sleeve 38 has a passage 40 into which an insulating plug 42 is inserted to close the passage 40. In this embodiment, the insulating plug 42 is formed by a stack of flexible insulating laminae 43 which are held together with a metal fastener 44. The lower laminae 43' are configured to slidably and sealably engage the passage 40, while the uppermost lamina 43" is somewhat oversized, and engages the cylindrical sleeve 38 to provide additional support to maintain the insulating plug 42 in position against the head of the molten metal reclaimed and to correct for any imperfections in the engagement of the lower laminae 43' with the passage 40. The flexible character of the laminae 43 allows the insulating plug 42 to be readily knocked out by the operator. Since accurately locating the insulating plug 42 from above may be difficult, an L-shaped prod 45 can be inserted by the operator into the passage 40 to raise the insulating plug 42 out of the passage 40 from below.

The reaction vessel 26 is preferably fabricated from stainless steel to which an insulating wash coating, such as ZircWash provided by ZYP Coatings, Inc., is applied when the reaction vessel 26 is to be employed for reclaiming aluminum from drosses formed on aluminum melts. The wash reacts with the dross and molten aluminum contained in the reaction vessel 26 to provide a chemically passive surface. The reaction vessel 26 so protected can withstand the caustic effects of the molten or semi-molten dross and exothermic mixture with minimal effect on the reaction vessel 26. The coating resulting from the wash need not be reapplied unless cleaning of the surface of the reaction vessel 26 is sufficiently rigorous as to produce an exposed bright metal surface. While a wide range of stainless steel compositions can be employed, it is preferred to employ a higher alloy stainless steel such as 310 stainless for the metal bottom member 36 and the substantially vertical sidewall 32, while the cylindrical sleeve 38 can be formed of a low carbon steel. These alloys, when welded, do not create heat affected zones and are not sensitized at the operating temperatures of the reaction vessel 26, and thus are not subject to attack by the hot flux and molten aluminum in contact with the bottom member 36. It is preferred to fabricate the reaction vessel 26 by TIG welding the components together, using a filler metal such as ER309 or, more preferably, ER310 stainless to avoid forming a sensitized region. The thickness of the substantially vertical sidewall 32 and the bottom member 36 should be maintained sufficiently thin to assure that the reaction vessel 26 can be adequately preheated by the metal melt 14 in the furnace 16 and to minimize weight, while being sufficiently thick to allow fabrication by welding and assure structural integrity of the reaction vessel 26. It has been found that 310 stainless stock having a thickness of about 0.060 to 0.125 inches can be welded to form the reaction vessel 26 with sufficient durability and can be adequately preheated when the reaction vessel 26 is positioned over the metal melt 14.

Figure 4:
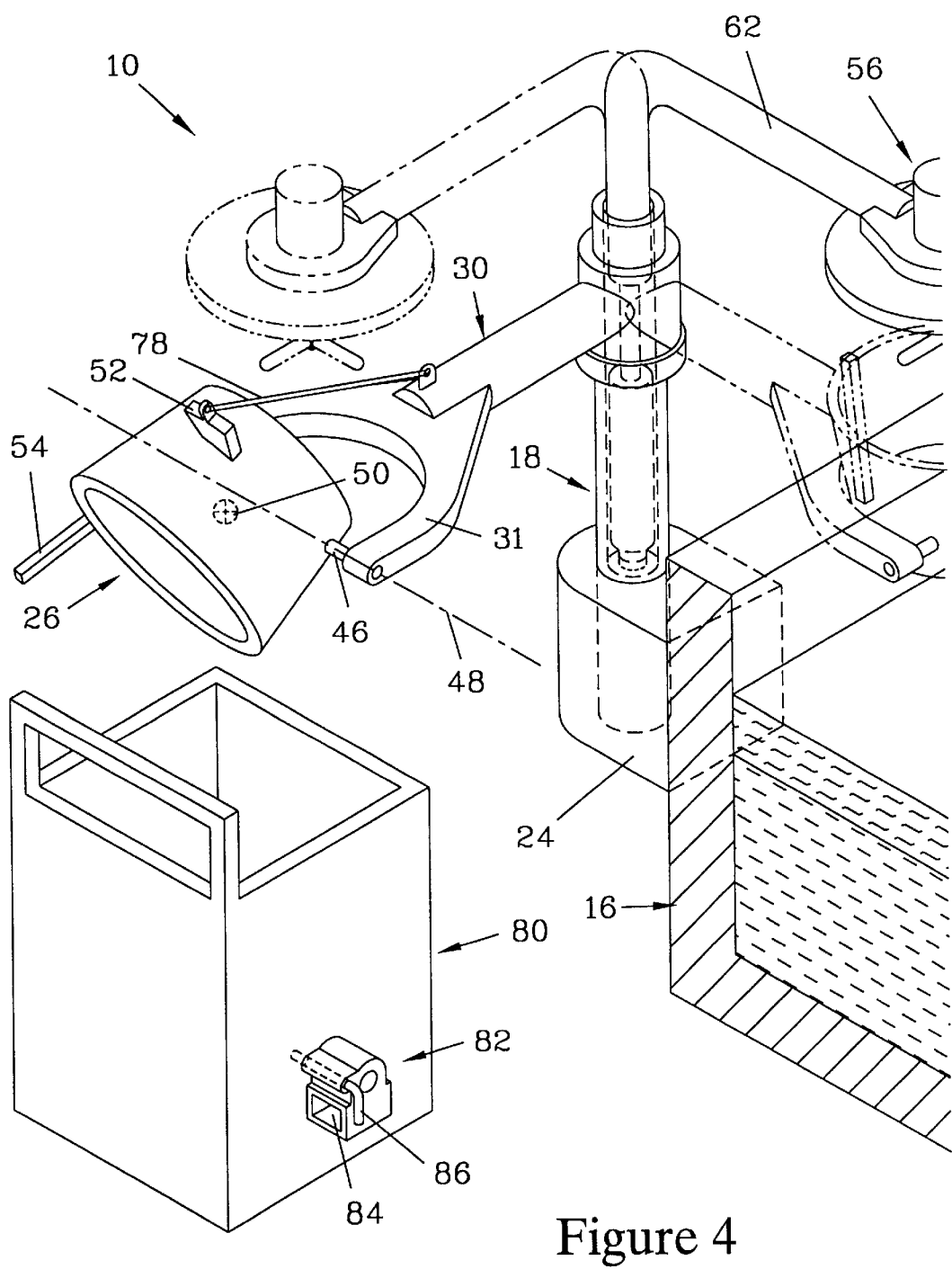
FIG. 4 shows the dross processing system shown in FIGS. 1 and 3, where the reaction vessel has been rotated to a disposal position outside the footprint of the furnace and has been pivoted to a dump position. In this embodiment, the motor can be independently rotated with respect to the reaction vessel.

In the dross processing system 10 illustrated in FIG. 1, the reaction vessel 26 is pivotally mounted to the reaction vessel mount 31 by trunnions 46 which rotatably engage the reaction vessel mount 31, allowing the reaction vessel 26 to be pivoted about a reaction vessel pivot axis 48. The reaction vessel pivot axis 48 is so positioned that, when the reaction vessel 26 is loaded with the dross 12, a center of gravity 50 of the reaction vessel 26 resides in a vertical plane which lies between the substantially vertical support 18 and a vertical plane containing the reaction vessel pivot axis 48. A pivot stop 52 (shown in FIG. 4) is provided, which engages the reaction vessel support 30 when the reaction vessel 26 is in a horizontal position. When in a horizontal position, the reaction vessel 26 is maintained there until acted upon by an operator to tip the reaction vessel 26, since the center of gravity 50 resides in a vertical plane positioned between the reaction vessel pivot axis 48 and the substantially vertical support 18, as is best shown in FIG. 1. To assist the operator in tipping the reaction vessel 26, a handle 54 is provided, which is attached to the reaction vessel 26.

A motor 56 is provided, which has a drive shaft 58 having a free end 60. The motor 56 is connected to a motor arm 62 via a motor mount 64. It should be appreciated that the motor arm 62 and the motor mount 64 can be formed as an integral unit. The motor arm 62 is in turn slidably and rotatably connected to the substantially vertical support 18, this connection allowing independent rotation of the motor 56 and the reaction vessel 26. The motor mount 64 is configured such that the drive shaft 58 is substantially vertical, with the free end 60 of the drive shaft 58 directed toward the reaction vessel 26 when the motor 56 resides above the reaction vessel 26, as is illustrated in FIG. 1.

Figure 3:
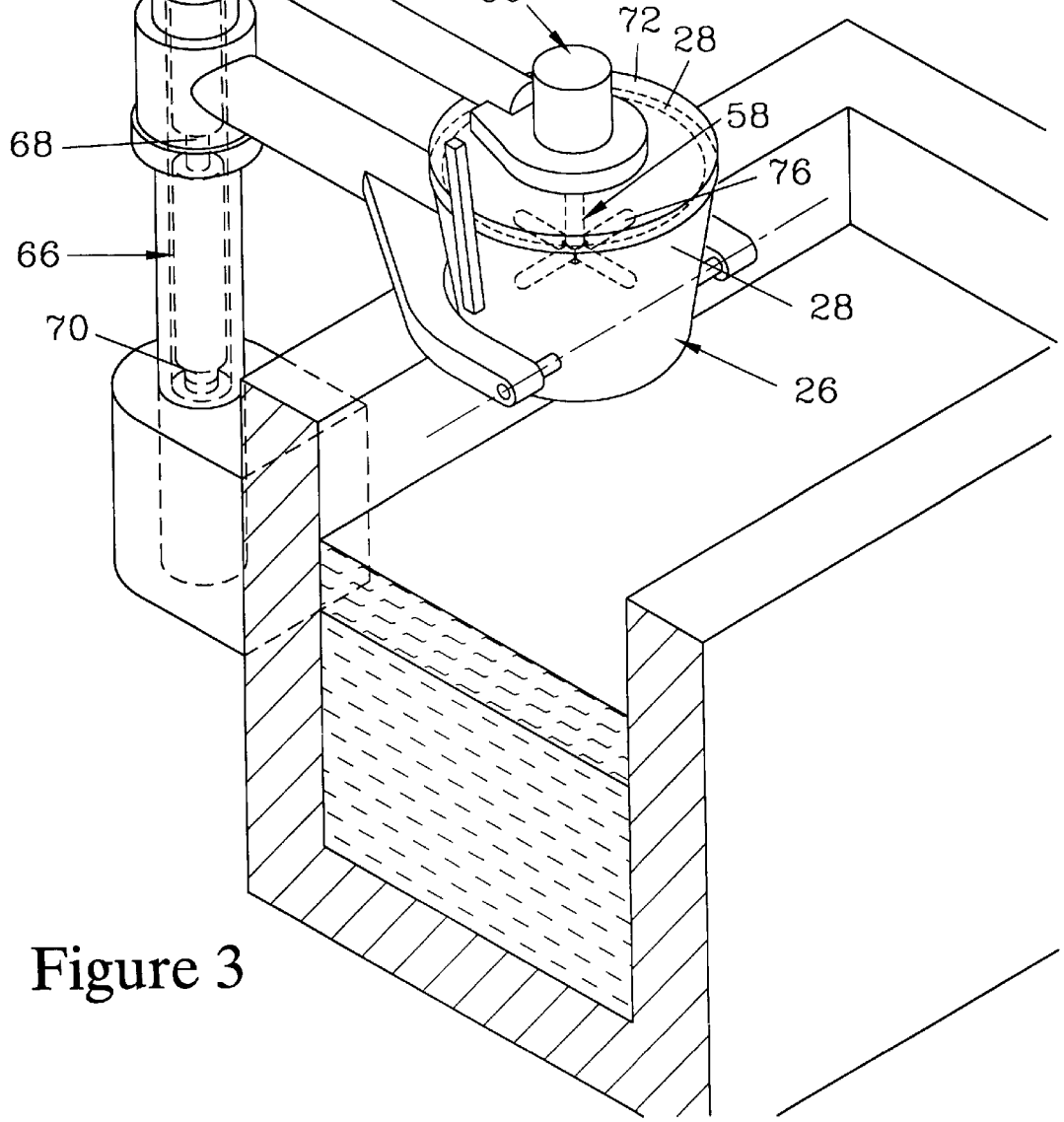
FIG. 3 shows the dross processing system shown in FIG. 1, where the motor is lowered to place the impeller within the reaction vessel.

A linear actuator 66, which in this embodiment is a hydraulic actuator, is employed to provide means for displacing the motor 56. The linear actuator 66 has a first actuator end 68 which is engaged by the motor arm 62 and a second actuator end 70 which is engaged by the substantially vertical support 18. When the linear actuator 66 is in its extended position (as illustrated in FIG. 1) the motor 56 is in a raised position, where the free end 60 of the drive shaft 58 resides above the reaction vessel 26. Alternatively, when the linear actuator 66 is in its contracted position (shown in FIG. 3) the motor 56 is in a lowered position where the free end 60 of the drive shaft 58 resides below the upper rim 28 of the reaction vessel 26. In this embodiment, the linear actuator 66 also serves as means for securing the motor 56 in the lowered position and in the raised position, since the first actuator end 68 is attached to the motor 56 via the motor arm 62 and the motor mount 64, while the second actuator end 70 is connected to the substantially vertical support 18.

A protective shield 72 is mounted to the motor mount 64. The protective shield 72 is configured to engage the upper rim 28 of the reaction vessel 26 when the motor 56 is in its lowered position, and serves to confine fumes generated by the reaction of an exothermic compound added to the dross being processed in the reaction vessel 26. A drive shaft passage 74 extends through the protective shield 72 to accommodate the drive shaft 58 of the motor 56.

An impeller 76 is attached to the free end 60 of the drive shaft 58 and can be lowered into the reaction vessel 26 to mix the dross 12 and the exothermic compound that are loaded into the reaction vessel 26. Such mixing serves to promote the coalescence of metal which is distributed throughout the dross 12. Care should be taken in selecting the mass and composition of the impeller 76 to assure that it does not act as a heat sink. Thus, the impeller 76 should be selected to have a low heat capacity and, if the impeller 76 is of metal, it should have a small mass. As discussed earlier, the insulating plug 42 is configured to be knocked out of the passage 40 to drain the metal which is collected in the bottom of the reaction vessel 26. If the reaction vessel 26 is maintained over the metal melt 14 when the insulating plug 42 is removed, the collected metal is returned directly to the metal melt 14 and is reclaimed in a molten state. Returning the recovered metal in a molten state results in a substantial savings in energy which would otherwise be required to heat, melt, and bring the recovered metal to the desired temperature for use.

After the metal is drained into the metal melt 14 residing in the furnace 16, the reaction vessel 26 is rotated to a disposal position where it resides outside the footprint of the furnace 16. In this embodiment, the rotation is provided by having the reaction vessel support 30 rotatably mounted to the substantially vertical support 18. After the reaction vessel 26 has been rotated, it is then pivoted relative to the reaction vessel support 30 to a dump position, shown in FIG. 4. A cable 78 attached to the reaction vessel support 30 and to the reaction vessel 26 limits the pivoting motion of the reaction vessel 26.

It is also preferred to have the motor arm 62 rotatably mounted to the substantially vertical support 18 so that the motor 56 can also be rotated outside the footprint of the furnace 16 for service of the motor 56 and for storage when not in use. As noted above, the connection of the motor arm 62 to the substantially vertical support 18 allows the motor 56 to be swung out of alignment with the reaction vessel 26 to facilitate loading of the dross 12 into the reaction vessel 26.

A spent dross container 80 is provided and positioned to receive the spent dross discharged from the reaction vessel 26 when it is pivoted to the dump position. To facilitate the placement and manipulation of the spent dross container 80, it is preferably provided with a pair of channels 82 (only one of which is shown) which are pivotably and lockably mounted to the spent dross container 80 and positioned such that the spent dross container 80 resides therebetween. A passage 84 in each of the channels 82 is configured to engage forks of a forklift (not shown). The channels 82 allow the spent dross container 80 to be readily transported to and from the furnace 16 by a fork lift, and for the spent dross container 80 to be positioned over a collection and shipping container for the spent dross. When so positioned, the channels 82 may be unlocked by removing channel lock pins 86 to allow dumping of the spent dross from the spent dross container 80 at some remote location.

Figure 5:
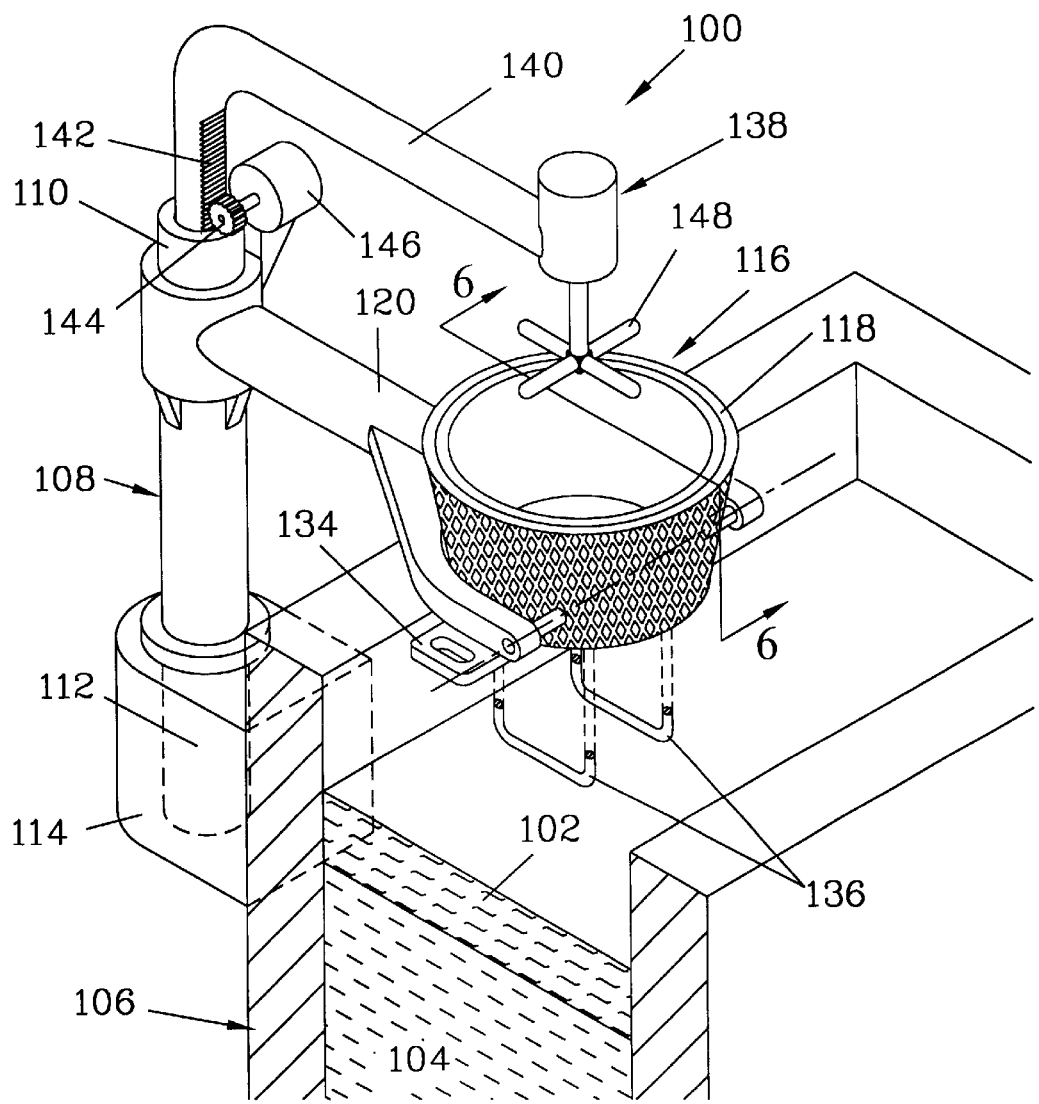
FIG. 5 is an isometric view of a dross processing system similar to the dross processing system shown in FIGS. 1–4, but where the motor does not rotate with respect to the reaction vessel. The dross processing system of this embodiment has a rack and pinion mechanism for raising and lowering the motor. This embodiment also employs a reaction vessel having a single shell with additional support provided by an expanded metal covering.
Figure 6:
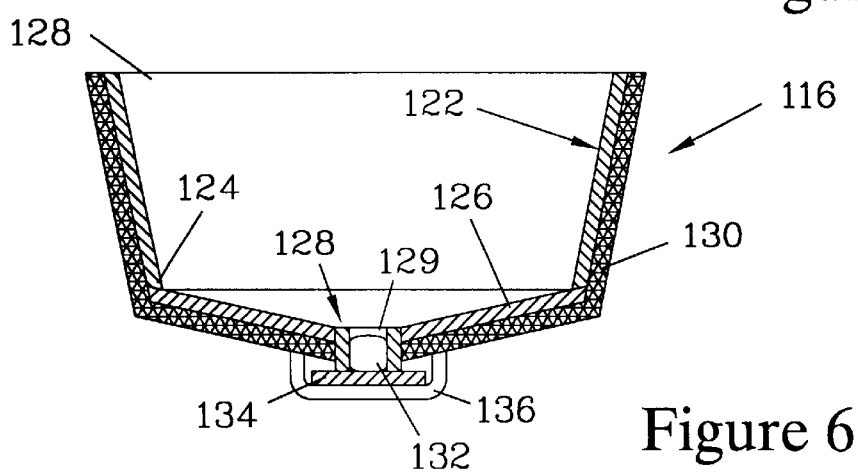
FIG. 6 is a view of the section 6–6 of the reaction vessel shown in FIG. 5. In this reaction vessel, the single shell is strengthened by expanded metal attached to the metal sheet stock. This reaction vessel also employs a plug support plate which rests on a pair of plate support bars.

FIGS. 5 and 6 are schematic representations of a dross processing system 100 which retains many of the features of the dross processing system 10. This embodiment differs in the details of the means for providing rotational motion for the reaction vessel support and the motor arm; the reaction vessel; and the reaction vessel support. It also employs a different mechanism for raising and lowering the motor.

The dross processing system 100 again is designed to process dross 102 skimmed from a metal melt 104 in a furnace 106. The dross processing system 100 has a substantially vertical support 108 terminating in a upper support region 110 and a lower support region 112. A bracket 114 is attached to the furnace 106 and, in this embodiment, rotatably engages the lower support region 112 of the substantially vertical support 108.

A reaction vessel 116 terminating in an upper rim 118 is supported by a reaction vessel support 120 that, in this embodiment, is affixed to the substantially vertical support 108. The substantially vertical support 108 can be rotated relative to the bracket 114 to position the reaction vessel 116 over the metal melt 104, as illustrated in FIG. 5. When so positioned, the dross 102 can be readily loaded into the reaction vessel 116.

FIG. 6 illustrates details of the reaction vessel 116, which is similar to the reaction vessel 26 discussed above in that it has a substantially vertical sidewall 122 terminating in the upper rim 118 and a lower rim 124, and has a bottom member 126 which is welded to the lower rim 124. Again, a cylindrical sleeve 128 extends through the bottom member 126, having a passage 129 therethrough to provide a port in the bottom member 126. To increase the structural rigidity of the reaction vessel 116 while maintaining a relatively small thermal mass, an expanded metal layer 130 is welded to the metal sheet stock of the substantially vertical sidewall 122 and the bottom member 126. Again, because of the multiple welds, the bottom member 126 is fabricated from a higher alloy stainless steel such as 310.

The passage 129 of the cylindrical sleeve 128 is sealed with an insulating plug 132, which is preferably fabricated from laminae of a flexible insulating fabric. The insulating plug 132 is configured to slidably and sealably engage the passage 129 in the cylindrical sleeve 128. In this embodiment, the insulating plug 132 is provided with additional support by a plug support plate 134 which rests on plate support bars 136 which are attached to the expanded metal layer 130. When it is desired to drain recovered metal from the reaction vessel 116, the plug support plate 134 is removed and the insulating plug 132 either is washed out by the pressure of the molten recovered metal or can be readily knocked out by the operator. When the insulating plug 132 is somewhat lower in height than the cylindrical sleeve 128, the step down caused by this difference in height allows the operator to accurately position a prod (not shown) to knock out the insulating plug 132 from above.

A motor 138 is mounted to a motor arm 140 that slidably engages the substantially vertical support 108. The motor arm 140 is fitted with a rack 142 which engages a pinion gear 144 which is driven by a gear motor 146 attached with respect to the substantially vertical support 108. This assembly serves as means for displacing the motor 138.

In this embodiment, when the reaction vessel support 120 is rotated, this rotation results in an equivalent rotation of the motor arm 140, since the rotation of both elements results from the rotation of the substantially vertical support 108 in the bracket 114. It should also be noted that loading of the reaction vessel 116 with the dross 102 is complicated by the position of an impeller 148 driven by the motor 138. Thus, the rack 142 and the pinion gear 144 must be capable of providing translation of the motor arm 140 to allow raising the motor 138 such that the impeller 148 is raised sufficiently to enable convenient loading of the reaction vessel 116, as well as allowing pivoting of the reaction vessel 116 to its dump position.

Figure 7:
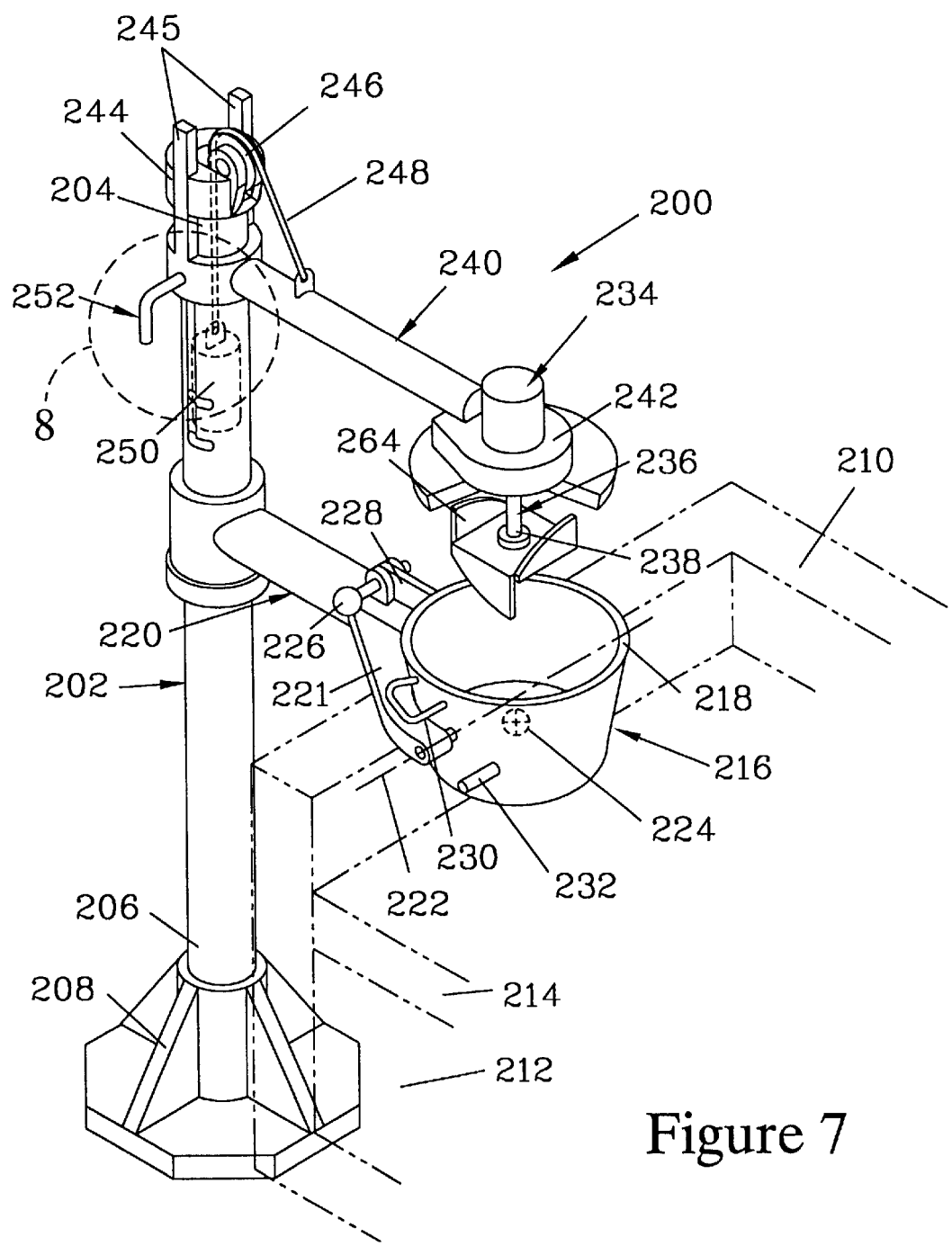
FIG. 7 is an isometric view of another embodiment of a dross processing system of the present invention, which is mounted on a stand. A protective shield engages the reaction vessel when the motor is lowered. In this embodiment, the motor is raised or lowered by a pulley and counterweight mechanism.

FIG. 7 is a schematic representation of a dross processing system 200 which forms a third embodiment of the present invention. This embodiment differs in part from the dross processing system 10 shown in FIGS. 1–4 and the dross processing system 100 shown in FIG. 5 in that the dross processing system 200 is free standing and not attached to a furnace. The dross processing system 200 also differs in the means for displacing the motor.

The dross processing system 200 again employs a substantially vertical support 202 having an upper support region 204 and a lower support region 206. The lower support region 206 engages a stand 208 which is positioned such that the substantially vertical support 202 is in close proximity to a furnace 210 which contains a metal melt 212 having dross 214 floating thereon.

Again, a reaction vessel 216 having an upper rim 218 is supported by a reaction vessel support 220 having a reaction vessel mount 221 to which the reaction vessel 216 is pivotably mounted. In this embodiment, the reaction vessel 216 has a pivot axis 222 which is vertically aligned with a center of gravity 224 of the reaction vessel 216 when the reaction vessel 216 is horizontally disposed. To lock the reaction vessel 216 in the horizontal position, a locking pin 226 is removably engaged with the reaction vessel support 220 and with a reaction vessel tab 228 affixed to the reaction vessel 216. A tilt handle 230 is provided to assist in pivoting the reaction vessel 216 to dump spent dross. A pivot stop 232 is attached to the reaction vessel 216 and is positioned to engage the reaction vessel support 220 when the reaction vessel 216 is pivoted to the dump position, the engagement of the pivot stop 232 with the reaction vessel mount 221 limiting the pivoting motion of the reaction vessel 216.

A motor 234 is provided having a drive shaft 236 terminating in a free end 238. The motor 234 is connected to a motor arm 240 by a motor mount 242, which can be an integral part of the motor arm 240. The motor arm 240 is slidably and rotatably connected to the substantially vertical support 202. The motor mount 242 is configured such that the drive shaft 236 is substantially vertical with the free end 238 of the drive shaft 236 directed toward the furnace 210 when the motor 234 resides over the furnace 210.

In the dross processing system 200, a cap element 244 is provided which is rotatably mounted to the upper support region 204 of the substantially vertical support 202 and is slidably engaged by indexing protrusions 245 which prevent rotation of the cap element 244 with respect to the motor arm 240. A pulley 246 is mounted to the cap element 244 and is positioned to accommodate a cable 248 strung thereover. The cable 248 in turn is connected at one end to the motor arm 240 and at the other end to a counter weight 250. The counterweight 250 is selected to substantially balance the weight of the motor arm 240 and the structures supported thereon. The above structure, in combination with a grip 252 mounted on the motor arm 240, serves as means for displacing the motor 234.

Figure 8:
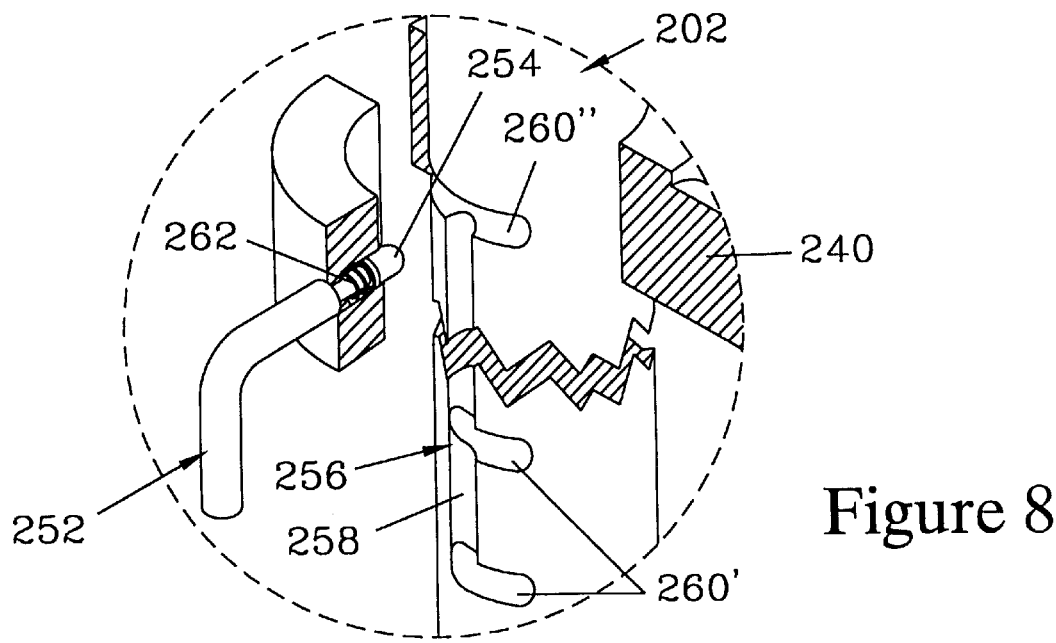
FIG. 8 is a detail view of the region 8 of FIG. 7, illustrating a grip and a track for directing, positioning, and locking the position of the motor.

The grip 252 has a grip extension 254 (illustrated in FIG. 8) which slidably engages a track 256 having a vertical segment 258 and horizontal cross spurs 260 in which the grip extension 254 rides. The horizontal cross spurs 260 are deeper than the vertical segment 258, and traverse the vertical segment 258. The horizontal cross spurs 260 serve as means for maintaining a fixed height of the motor arm 240 while allowing limited rotational motion between the motor arm 240 and the substantially vertical support 202. Contact between the grip extension 254 and the track 256 and the horizontal cross spurs 260 is maintained by a compression spring 262. The horizontal cross spurs 260 of the track 256 include two lower cross spurs 260', which limit rotation of the motor arm 240 in two respective lower positions to limit motion of the drive shaft 236 within the reaction vessel 216, and an upper cross spur 260" which is extended to allow rotation of the motor arm 240 to a position where the motor 234 resides outside the footprint of the furnace 210. The extended upper cross spur 260" also allows the motor 234 to be rotated independently of the reaction vessel 216.

An impeller 264 is attached to the free end 238 of the drive shaft 236 and serves as a stirrer. The impeller 264 is positioned so as to reside in the reaction vessel 216 when the grip extension 254 is engaged in either of the lower cross spurs 260'. The length of the lower cross spurs 260', which regulate the horizontal motion of the impeller 264 when positioned in the reaction vessel 216, is determined in part on the difference between the inside diameter of the reaction vessel 216 and the diameter of impeller 264.

Figure 9:
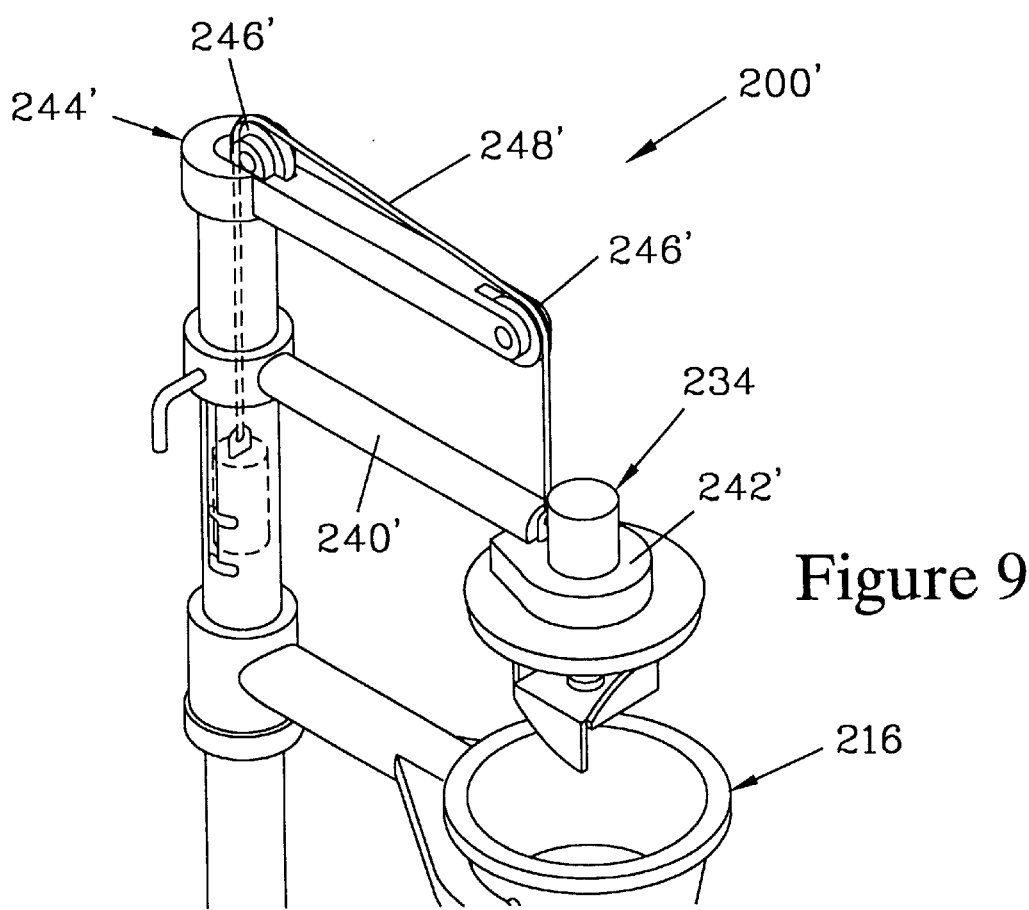
FIG. 9 is a partial view of an embodiment similar to that shown in FIG. 7, but where multiple pulleys and a different counterweight mechanism are employed to raise or lower the motor.

FIG. 9 illustrates a portion of a dross processing system 200' which is similar to the dross processing system 200 discussed above, but which differs in the details of the means for displacing the motor 234. In the dross processing system 200', a cap element 244' is extended over the motor arm 240', and is provided with a pair of pulleys 246'. A cable 248' is strung over the pulleys 246' and is connected at one end to the motor mount 242', rather than to the motor arm 240'. This configuration of the cable 248' is felt to provide a more direct force for raising or lowering the motor 234 and assists in the tracking of the cap element 244' with the motor arm 240'.

Figure 10:
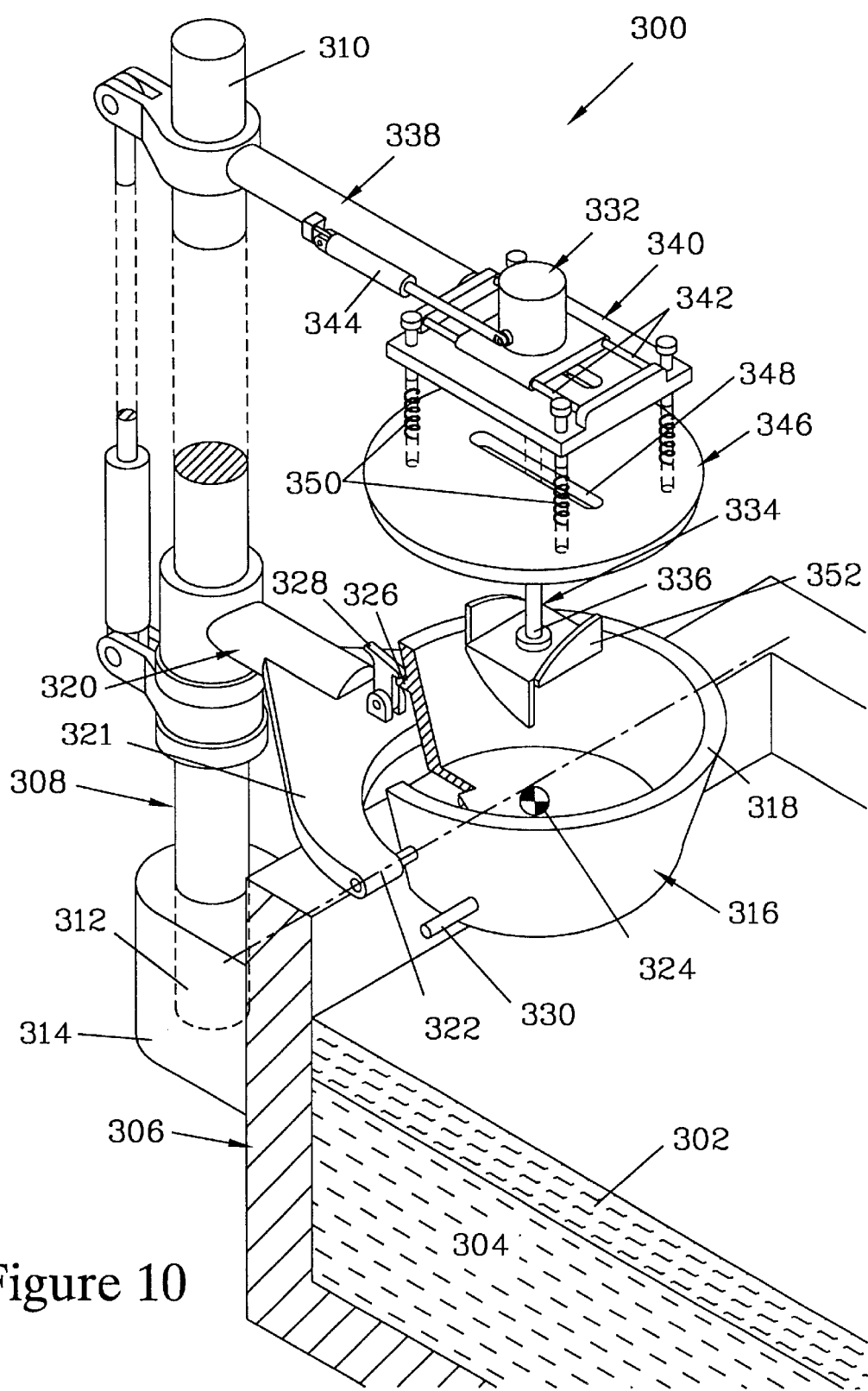
FIG. 10 is an isometric view showing another embodiment of the dross processing system of the present invention, which has a protective shield that is movable with respect to the motor. In this embodiment, the motor may be moved in a horizontal plane to increase its mixing capacity.

FIG. 10 is schematic representation of another embodiment of the present invention, a dross processing system 300 which shares many features in common with the dross processing system 10 illustrated in FIGS. 1–4. The dross processing system 300 is designed to process dross 302 skimmed from a metal melt 304 in a furnace 306. The dross processing system 300 has a substantially vertical support 308 terminating in an upper support region 310 and a lower support region 312. A bracket 314 is provided which is attached to the furnace 306 and which engages the lower support region 312 of the substantial vertical support 308.

A reaction vessel 316 having an upper rim 318 is supported by a reaction vessel support 320. The reaction vessel 316 is pivotally mounted to the reaction vessel support 320 via a reaction vessel mount 321. The reaction vessel support 320 in turn is rotatably mounted on the substantially vertical support 308, allowing the reaction vessel 316 to reside over the metal melt 304 for loading the dross 302, and to be subsequently swung away from the furnace 306 when dumping the spent dross. Again, the reaction vessel 316 is preferably fabricated from stainless steel sheet stock which, in this embodiment, does not have a supporting layer of expanded metal affixed thereto.

The reaction vessel 316 is pivotally mounted about a reaction vessel pivot axis 322 which, in this embodiment, is positioned in a vertical plane residing between the substantially vertical support 308 and a center of gravity 324 of the reaction vessel 316 when the reaction vessel 316 is positioned such that the upper rim 318 is horizontal. The reaction vessel 316 is provided with a tab 326, which engages a latch 328 mounted on the reaction vessel support 320 when the reaction vessel 316 is in a horizontal position. The engagement of the tab 326 with the latch 328 maintains the reaction vessel 316 in the horizontal position until it is desired to dump spent dross from the reaction vessel 316. When the latch 328 is disengaged, the reaction vessel 316 is acted on by gravity and pivots from the horizontal position to an inclined position determined by engagement of a pivot stop 330 with the reaction vessel mount 321. When the reaction vessel 316 is so inclined, the spent dross is dumped into a spent dross container (not shown).

A motor 332 is provided which has a drive shaft 334 having a free end 336. The motor 332 is connected to a motor arm 338 via a motor mount 340, and the motor arm 338 in turn is slidably and rotatably connected to the substantially vertical support 308. The motor mount 340 of this embodiment has guide tracks 342 on which the motor 332 rides. Horizontal motion of the motor 332 along the guide tracks 342 is provided by a motor actuator 344 which attaches to the motor 332 and to the motor arm 338. The motor mount 340 and the guide tracks 342 are configured such that the drive shaft 334 is vertically oriented with the free end 336 of the drive shaft 334 directed toward the furnace 306 when the motor 332 is positioned above the furnace 306.

The dross processing system 300 is provided with a protective shield 346 which has a drive shaft passage 348 therethrough. The drive shaft passage 348 is configured to accommodate motion of the drive shaft 334 as the motor 332 traverses the guide tracks 342. The protective shield 346 is also configured to engage the upper rim 318 of the reaction vessel 316. In this embodiment, the protective shield 346 is resiliently mounted to the motor mount 340 so that the motor arm 338 can be maintained in multiple lowered positions with the protective shield 346 biased towards engagement with the upper rim 318 of the reaction vessel 316 by compression springs 350.

An impeller 352 is attached to the free end 336 of the drive shaft 334 and can be lowered into the reaction vessel 316 to mix the dross 302 and exothermic compound that are loaded therein to promote the coalescence of the metal from the dross 302. The range of motion of the motor 332 along the guide tracks 342 is determined, in part, by the difference between the inside diameter of the reaction vessel 316 and the diameter of the impeller 352.

Figure 11:
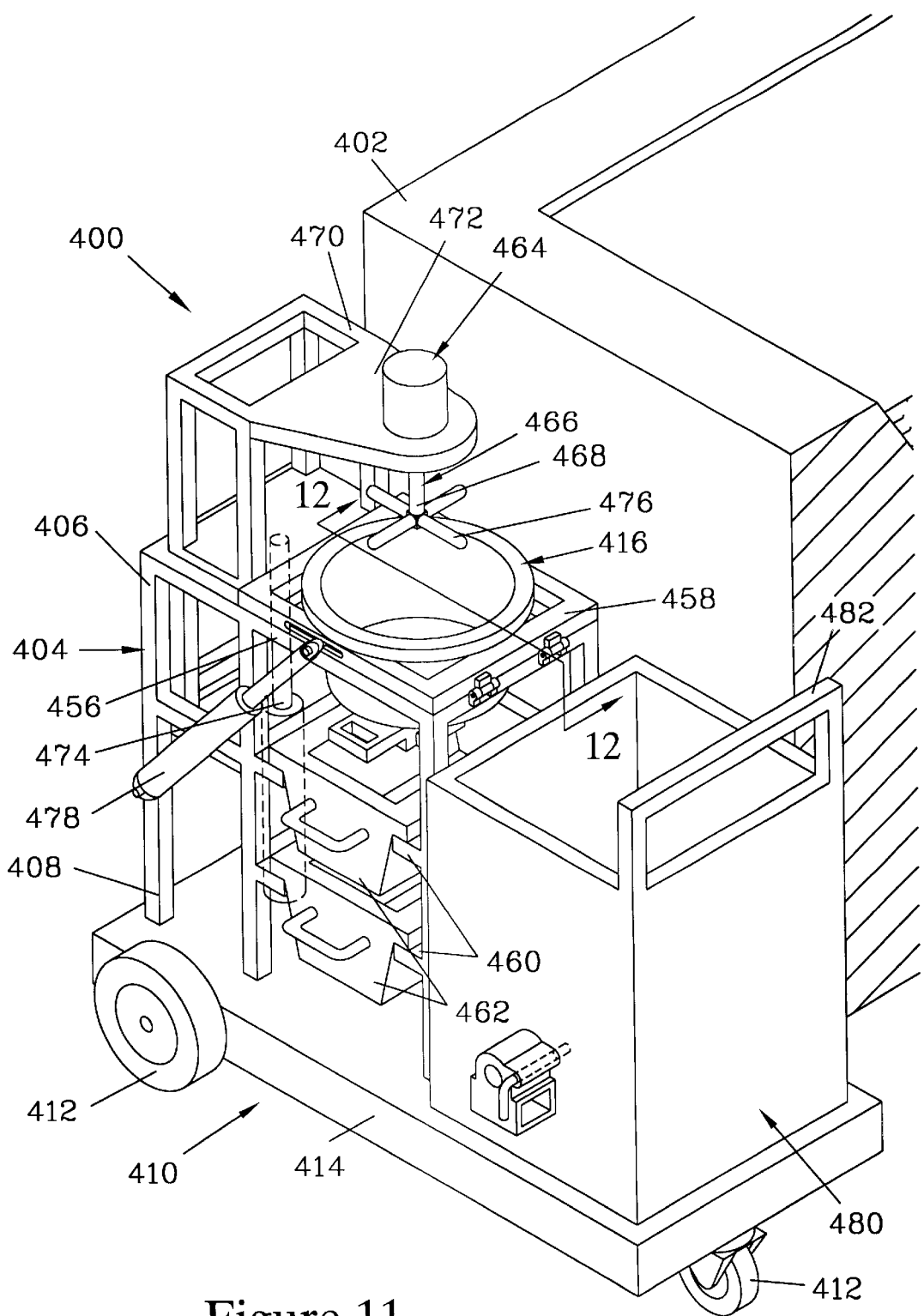
FIG. 11 is an isometric view of another embodiment of the dross processing system of the present invention, which is mounted on a wheeled platform that may be positioned close to the furnace. This embodiment has a dual shell reaction vessel, and employs hydraulic linear actuators for moving the motor and dumping the reaction vessel to provide partial automation of the dross processing.

FIG. 11 illustrates a dross processing system 400 which differs from the earlier described systems in that the dross processing system 400 is constructed as a compact mobile system which is self contained and partially automated. The dross processing system 400 is designed to be rolled to a position beside a furnace 402 by a furnace attendant, and to be readily operated by the furnace attendant with minimal training.

The dross processing system 400 has a substantially vertical support 404 terminating in an upper support region 406 and a lower support region 408. A stand 410 is provided, which is mounted on wheels 412 to allow the stand 410 to be readily moved. The stand 410 has a platform 414 to which the lower support region 408 of the substantially vertical support 404 is mounted.

In this embodiment, a reaction vessel 416 is provided which resides outside the footprint of the furnace 402 at all times. The reaction vessel 416 can be formed in a similar manner to the reaction vessel 26 discussed above, from stainless sheet metal stock having a thickness of between about 0.060 and 0.125 inches. Since the reaction vessel 416 is not be subject to preheating over the furnace 402, forming the reaction vessel 416 of stock having a thickness near the lower limit is preferred to avoid rapid cooling of the metal-bearing dross placed therein. To further prevent chilling of the dross being processed, the reaction vessel 416 can be insulated to reduce radiant heat loss.

One suitable insulating structure for the reaction vessel 416 is that of the crucible described in U.S. application Ser. 09/233,564, now issued as U.S. Pat. No. 6,136,262, which has a metal rim to which an expanded metal frame is attached, the frame being subsequently covered with a moldable refractory cloth. While such reaction vessels function well, it has been found that the reaction vessels so constructed are subject to damage in service.

Figure 12:
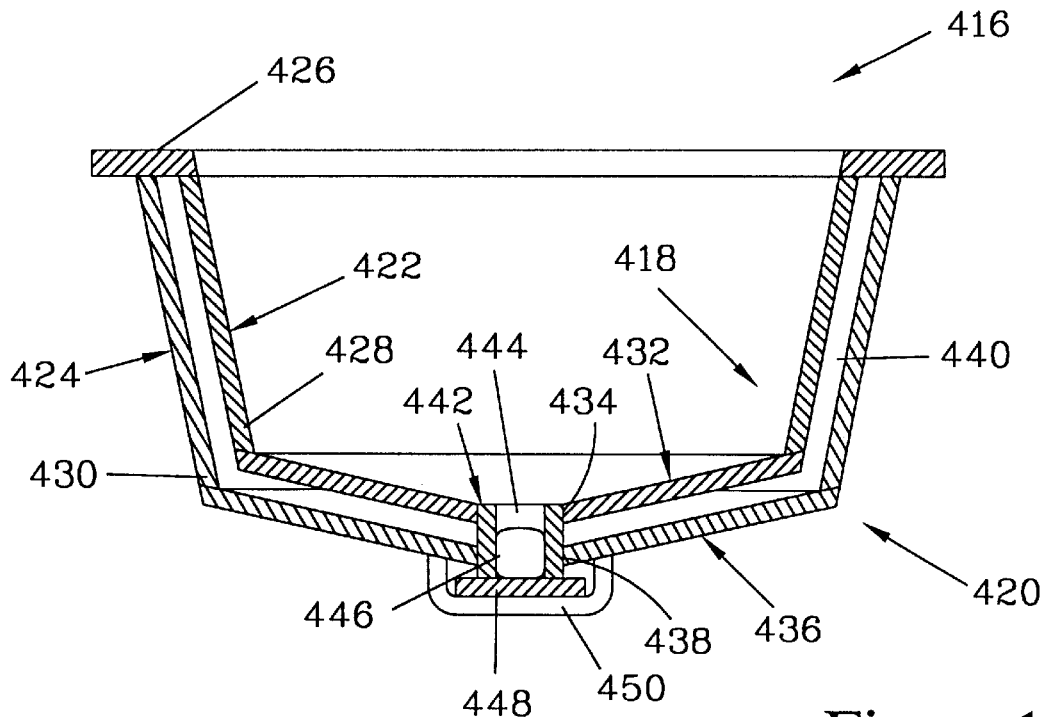
FIG. 12 is a view of the section 12—12 of the dual shell reaction vessel shown in FIG. 11, and illustrates further details of the structure of the dual shell reaction vessel. The dual shell reaction vessel is fabricated with a double shell, each shell being fabricated from metal sheet stock. The shells are maintained in a spaced-apart relationship by welding the shells to a common upper rim, forming an upper terminal surface of the reaction vessel. Similarly, both shells are welded to a sleeve which passes through the bottom sections of the shells to form a lower terminal surface of the reaction vessel and which provides a port.

A more preferred structure for providing insulation to the reaction vessel 416 is to employ a dual shell structure, such as illustrated in FIG. 12, which provides longer service life. The reaction vessel 416 has an inner shell 418 and an outer shell 420, both of which are fabricated from stainless steel sheet stock.

The inner shell 418 has a substantially vertical inner sidewall 422 fabricated from sheet metal stock, which is spaced apart from a substantially vertical outer sidewall 424 of the outer shell 420, which is also fabricated from metal sheet stock. Again, it should be noted that the sidewalls (422, 424) are preferably provided with a small degree of draft to assist in eliminating dross from the reaction vessel 416 when dumped. The two sidewalls (422, 424) are welded to a common upper rim 426 formed from a metal ring. The substantially vertical inner sidewall 422 terminates in an inner lower rim 428, while the substantially vertical outer sidewall 424 terminates in an outer lower rim 430 which is spaced apart from the inner lower rim 428. A metal inner bottom member 432 is fabricated by spinning a sheet of metal into a conical shape with an inner hole 434 cut out at the apex of the conical surface. The inner bottom member 432 is welded to the inner lower rim 428. Similarly, an outer bottom member 436 is spun to form a conical shape with an outer hole 438 at is apex. The outer bottom member 436 is maintained in a spaced apart relationship with the inner bottom member 432 and is welded to the outer lower rim 430. The depths of the substantially vertical sidewalls (422, 424) are maintained to assure that the bottom members (432, 436) are maintained in a spaced apart relationship. Between the spaced apart inner shell 418 and outer shell 420 is an open volume 440.

A cylindrical sleeve 442 extends through the holes (434, 438) and is welded to both the inner bottom member 432 and the outer bottom member 436. The sleeve 442 has a passage 444 therethrough which provides a port for the inner bottom member 432. It is preferred that, in addition to a plug 446 for maintaining the metal collected in the bottom of the reaction vessel 416, a plug support plate 448 be provided which rests on plate support bars 450 which are attached to the outer bottom member 436 of the reaction vessel 416.

Figure 13:
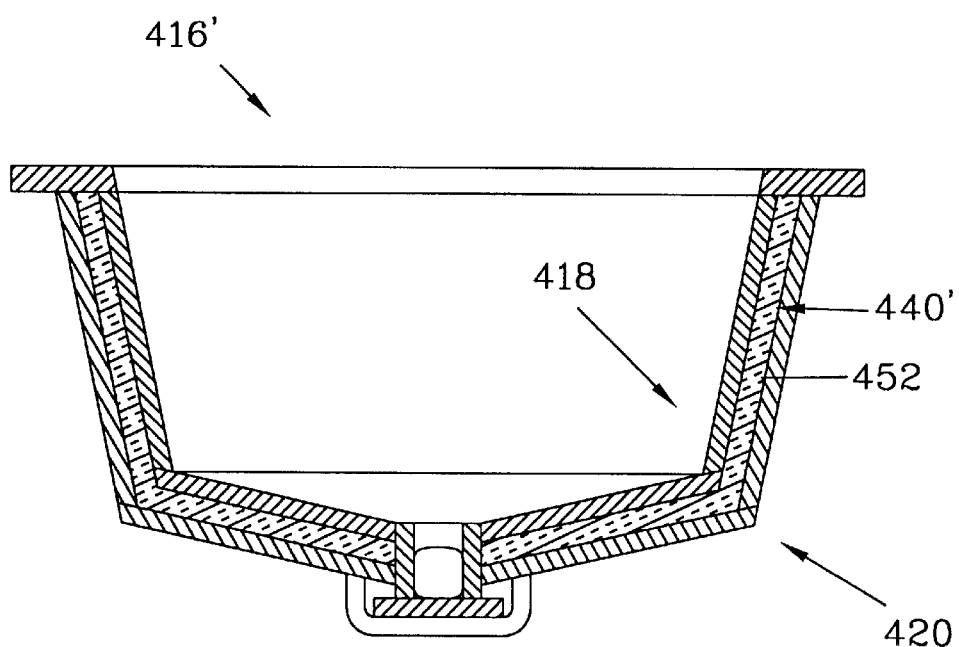
FIG. 13 is a view which corresponds to the view of FIG. 12, and shows another dual shell reaction vessel that forms another embodiment of the present invention. The reaction vessel of FIG. 13 differs from the embodiment of FIG. 12 in that the region between the spaced apart walls is filled with a woven or matted insulating material. The insulating material contributes to the rigidity to the reaction vessel and allows thinner metal sheet stock to be employed in fabricating the dual shell reaction vessel.

An alternative reaction vessel 416' is shown in FIG. 13. The reaction vessel 416' is similar to the reaction vessel 416 shown in FIG. 12; however, in the reaction vessel 416' the open volume 440' has been filled with an insulating mat 452 to increase the structural rigidity of the reaction vessel 416'. It is preferred that the insulating mat 452 be either a bonded material or a woven material to further enhance the structural rigidity of the resulting reaction vessel 416'.

Figure 14:
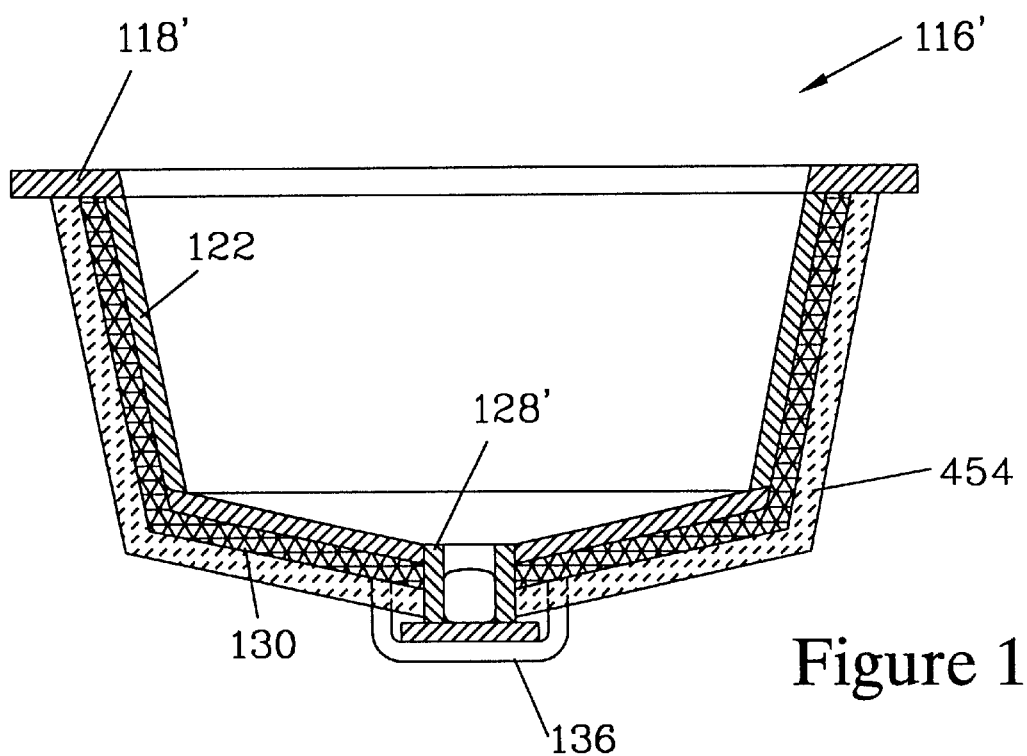
FIG. 14 is another view corresponding to the view of FIG. 12, which illustrates details of another alternative embodiment for the reaction vessel. This reaction vessel employs a refractory material applied over an expanded metal layer such as that employed in the embodiment shown in FIG. 6.

Another alternative quasi-dual shell reaction vessel 116' suitable for use in the dross processing system 400 is illustrated in FIG. 14. The reaction vessel 116' is a modification of the reaction vessel 116 of the embodiment illustrated in FIG. 6. The modified reaction vessel 116' has an extended upper rim 118' which attaches to the substantially vertical sidewall 122 and to the expanded metal layer 130. An outer shell 454 is fabricated from a moldable refractory material which is applied to the expanded metal layer 130. An extended cylindrical sleeve 128' extends through the outer shell 454, and the plate support bars 136 are attached to the expanded metal layer 130 prior to applying the outer shell 454.

Referring again to FIG. 11, the reaction vessel 416 is pivotally mounted to a reaction vessel support 456 either directly or, as illustrated, via a reaction vessel cradle 458 in which the reaction vessel 416 resides. The reaction vessel support 456 in turn is either directly mounted to the substantially vertical support 404 or is mounted with respect thereto via the stand 410. The reaction vessel support 456 is preferably also provided with one or more collection pan tracks 460 on which metal collection pans 462 reside. The metal collection pans 462 are positioned to catch molten metal drained through the passage 444 of the reaction vessel 416.

A motor 464 having a drive shaft 466 with a free end 468 is provided. A motor arm 470 which slidably engages the substantially vertical support 404 resides above the reaction vessel 416 when the reaction vessel 416 is in a horizontal position, as is illustrated in FIG. 10. A motor mount 472 attaches the motor 464 to the motor arm 470 and is configured such that the drive shaft 466 is substantially vertical and the free end 468 of the drive shaft 466 is directed toward the reaction vessel 416 when it is in its horizontal position.

A motor linear actuator 474 is attached to the substantially vertical support 404 and to the motor arm 470 and provides means for displacing the motor 464 such that an impeller 476 can be lowered into and raised out of the reaction vessel 416.

Figure 15:
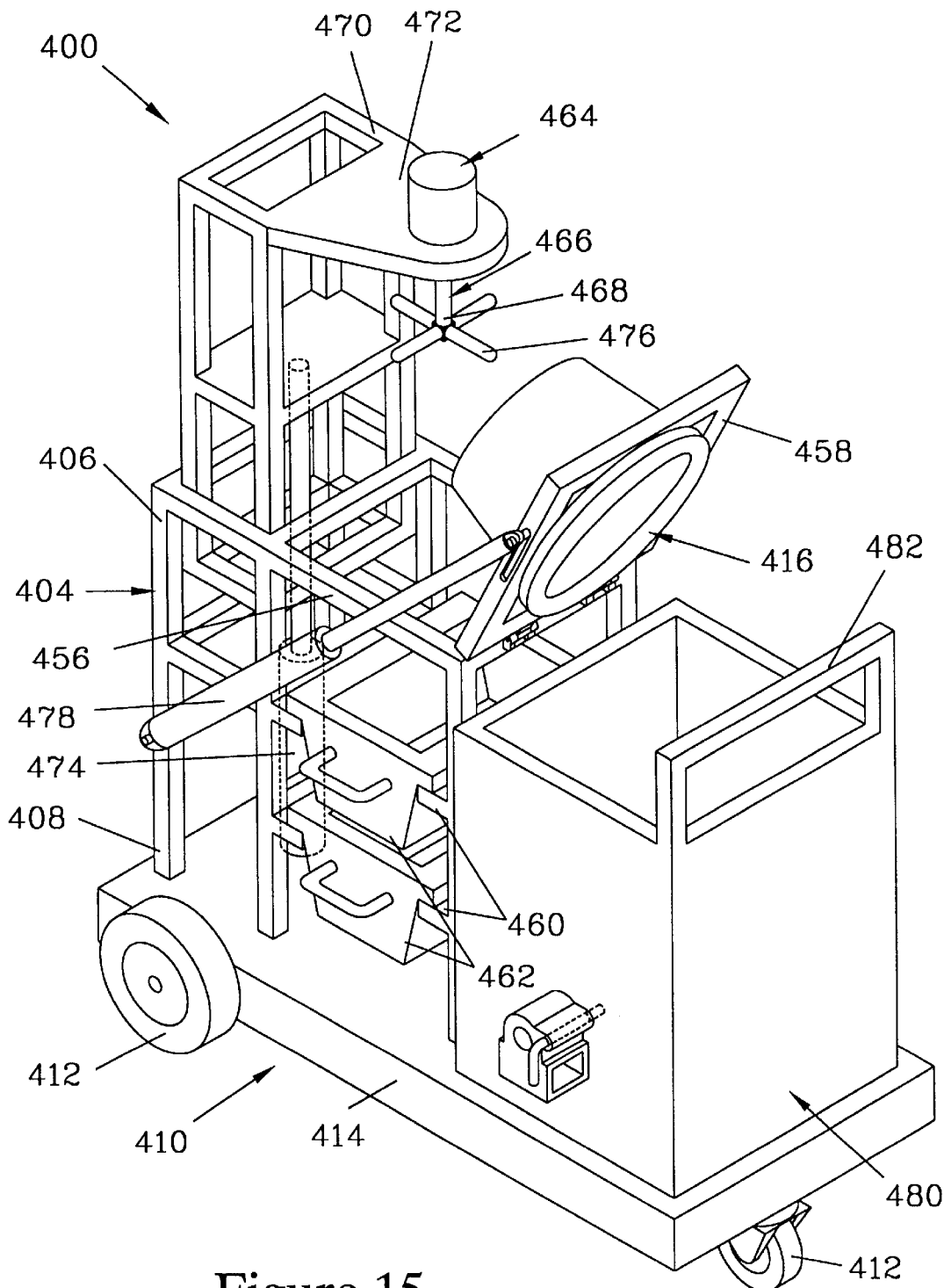
FIG. 15 illustrates the embodiment shown in FIG. 11 where a reaction vessel linear actuator has been extended to pivot the reaction vessel to a dump position.

To dump the spent dross after draining the collected metal, a reaction vessel linear actuator 478 is employed which is pivotably attached with respect to the reaction vessel support 456 and pivotably and slidably connected to the reaction vessel cradle 458. In the dross processing system 400, the reaction vessel linear actuator 478 is attached to the substantially vertical support 404. When the reaction vessel linear actuator 478 is in its extended position, the reaction vessel 416 is in the dump position, as illustrated in FIG. 15. The platform 414 of the stand 410 is sufficient in size to accommodate a spent dross receptacle 480 into which the spent dross is dumped.

While this embodiment employs linear actuators (474, 478) to impart translational motions, it should be appreciated that other actuators could be employed. However, it is preferred for hydraulic linear actuators to be employed to simplify providing a system where the various movement operations can be readily controlled from a control panel by regulating the pressure supplied to the hydraulic linear actuators.

The dross processing system 400 illustrated in FIGS. 11 and 15 is well suited to provide an automated dross processing system which reduces the attention to processing required by the furnace attendant. Having linear actuators employed to move both the motor and the pivoting of the reaction vessel allows the employment of a controller to sequence these movements to coordinate the two actions. Such a controller could also be designed to control the timing of the stirring cycle and the length of the dump, to provide partial automation of the dross processing system.

Figure 16:
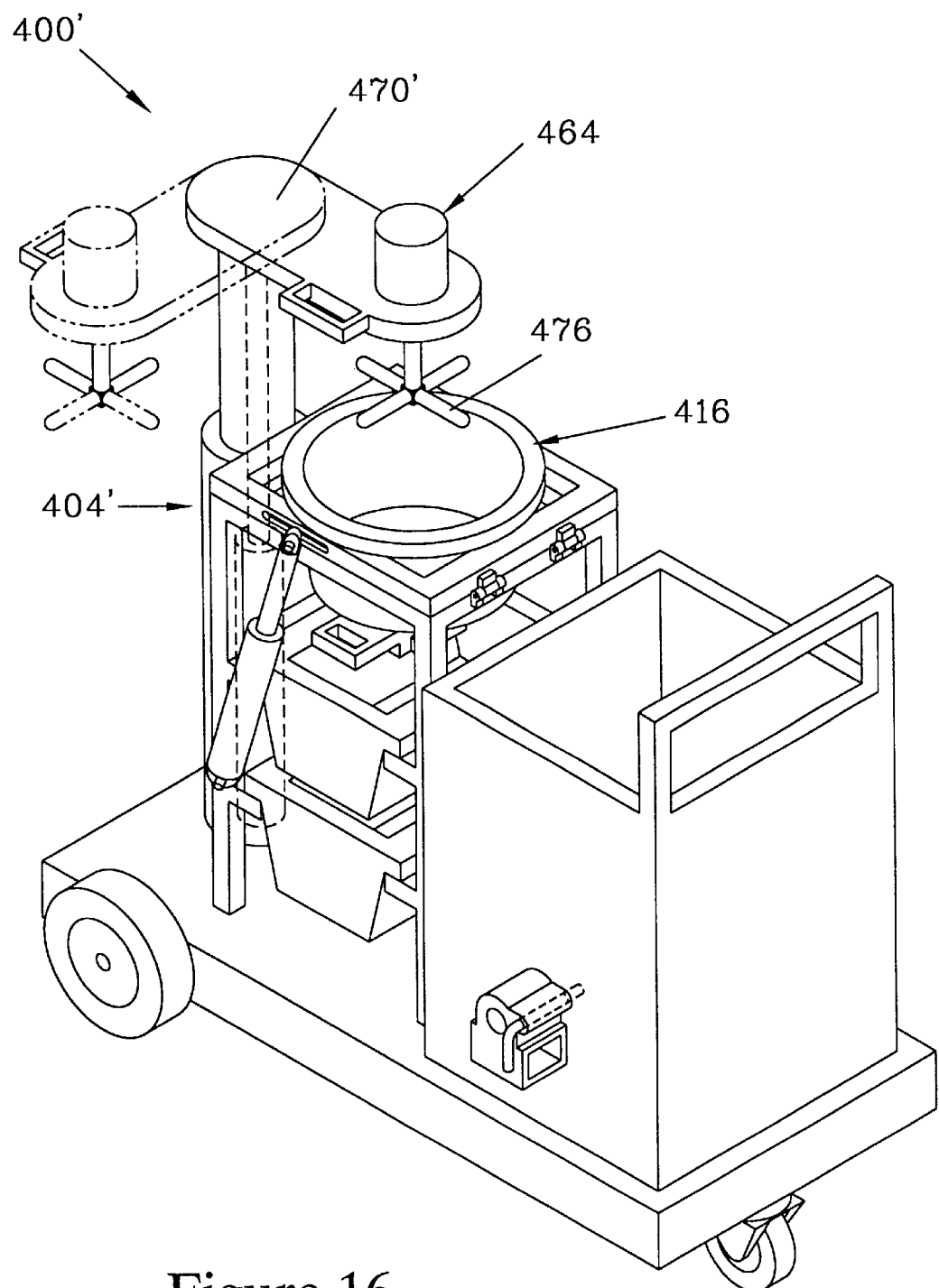
FIG. 16 illustrates an embodiment similar to the embodiment shown in FIGS. 11 and 15, but where the motor arm is rotatably mounted to allow the motor to be swung away from the reaction vessel. Such motion simplifies loading of the reaction vessel with dross and also reduces the height to which the impeller needs to be raised to allow dumping to eliminate the contents of the reaction vessel.

FIG. 16 illustrates another embodiment for a dross processing system 400' which provides a compact mobile system. The dross processing system 400' differs from the dross possessing system 400 principally in the details of the substantially vertical support 404' and how the motor arm 470' mounts to the substantially vertical support 404'. In the dross possessing system 400', the motor arm 470' is both slidably and rotatably mounted with respect to the substantially vertical support 404' such that the motor 464 can be rotated into alignment with the reaction vessel 416 and, when so aligned, can be raised and lowered so as to place the impeller 476 into and out of the reaction vessel 416.

As shown in phantom, the motor arm 470' can be so positioned as to leave the surface of the reaction vessel 416 exposed, such that dross can be readily loaded therein.

Figure 17:
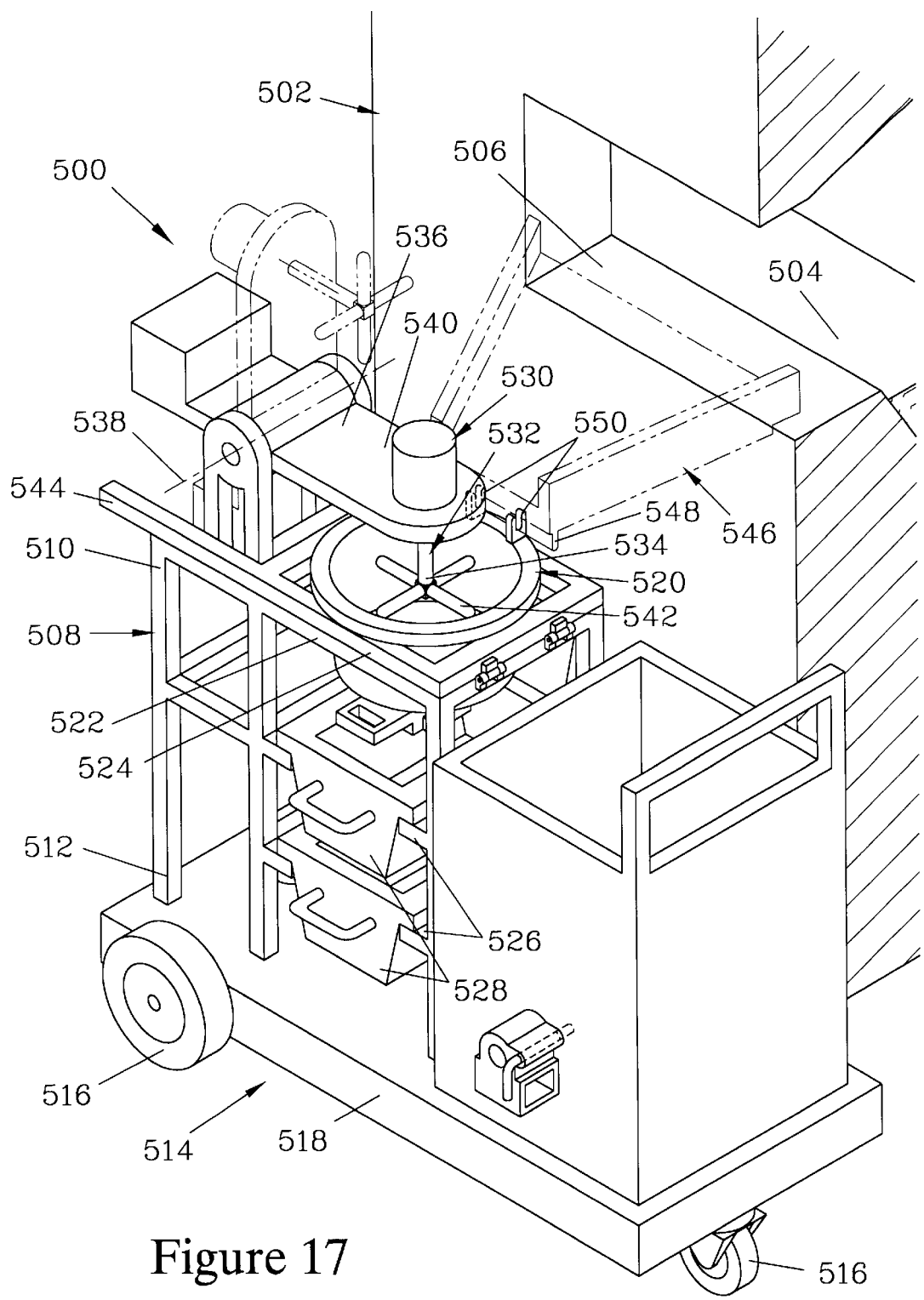
FIG. 17 is an isometric view of another embodiment of a dross processing system which is mounted on a wheeled platform. In this embodiment, the motor is raised and lowered by pivoting, and a lever facilitates dumping the reaction vessel. This embodiment also employs a dross loading chute for raking dross from the furnace into the reaction vessel.

FIG. 17 illustrates a dross processing system 500 which is similar to the system illustrated in FIGS. 11 and 16, but which differs in that the dross processing system 500 has a manual method for raising and lowering the motor. The dross processing system 500 is designed to be positioned near a furnace 502 where a metal melt 504 approaches the top of a furnace well 506.

The dross processing system 500 again has a substantially vertical support 508 terminating in an upper support region 510 and a lower support region 512. A stand 514 is provided which is mounted on wheels 516 allowing the stand 514 to be readily moved. The stand has a platform 518 to which the lower support region 512 of the substantially vertical support 508 is mounted. A reaction vessel 520 is provided, which again resides outside the footprint of the furnace 502 at all times. It is preferred to use the reaction vessel structure described in the discussion of the embodiment of FIGS. 11 and 16.

The reaction vessel 520 is pivotally mounted to a reaction vessel support 522 either directly or via a reaction vessel cradle 524 in which the reaction vessel 520 resides. The reaction vessel support 522 in turn is either directly mounted to the substantially vertical support 508 or is mounted with respect thereto via the stand 514. The reaction vessel support 522 is also provided with collection pan tracks 526 on which metal collection pans 528 reside.

motor 530 having a drive shaft 532 with a free end 534 is provided. In the dross processing system 500, the motor 530 is pivotably mounted with respect to the substantially vertical support 508 to provide means for displacing the motor 530 with respect to the reaction vessel 520. The motor 530 is mounted to a motor arm 536 which is pivotally engaged with the upper support region 510 of the substantially vertical support 508 so as to pivot about an arm pivot axis 538. The pivotable engagement of the motor arm 536 with the substantially vertical support 508 allows the motor 530 to be pivoted between a lowered position (as shown in FIG. 17), where the motor 530 resides above the reaction vessel 520 and the motor arm 536 is in a horizontal position, and a raised position, where the motor 530 is moved away from the reaction vessel 520 and the motor arm 536 is substantially vertical (as shown in phantom in FIG. 17).

The motor 530 is mounted to the motor arm 536 via a motor mount 540, which is configured such that the drive shaft 532 is substantially vertical and the free end 534 of the drive shaft 532 is directed toward the reaction vessel 520 when the motor arm 536 is in its horizontal position. An impeller 542 is attached to the free end 534 of the drive shaft 532, and pivoting the motor 530 swings the impeller 542 into and out of the reaction vessel 520. While this simplifies the mechanism for raising and lowering the motor 530, it places greater limitations on the size ratio of the impeller 542 to the reaction vessel 520.

To facilitate dumping the spent dross, a handle or lever 544 is attached to the reaction vessel cradle 524. To dump the spent dross, the operator pivots the motor 530 away from the reaction vessel 520 to provide clearance and uses the lever 544 to pivot the reaction vessel cradle 524 to move the reaction vessel 520 to its dump position.

In the furnace configuration illustrated in FIG. 17, where the level of the metal melt 504 approaches the top of the furnace well 506, the dross may be raked rather than ladled out of the furnace 502. To facilitate raking, a dross loading chute 546 (shown in phantom) is provided. The dross loading chute 546 can be fabricated from a metal sheet and has a chute coupling tab 548 which engages coupling fingers 550 attached to the rim of the reaction vessel 520.

Figure 18:
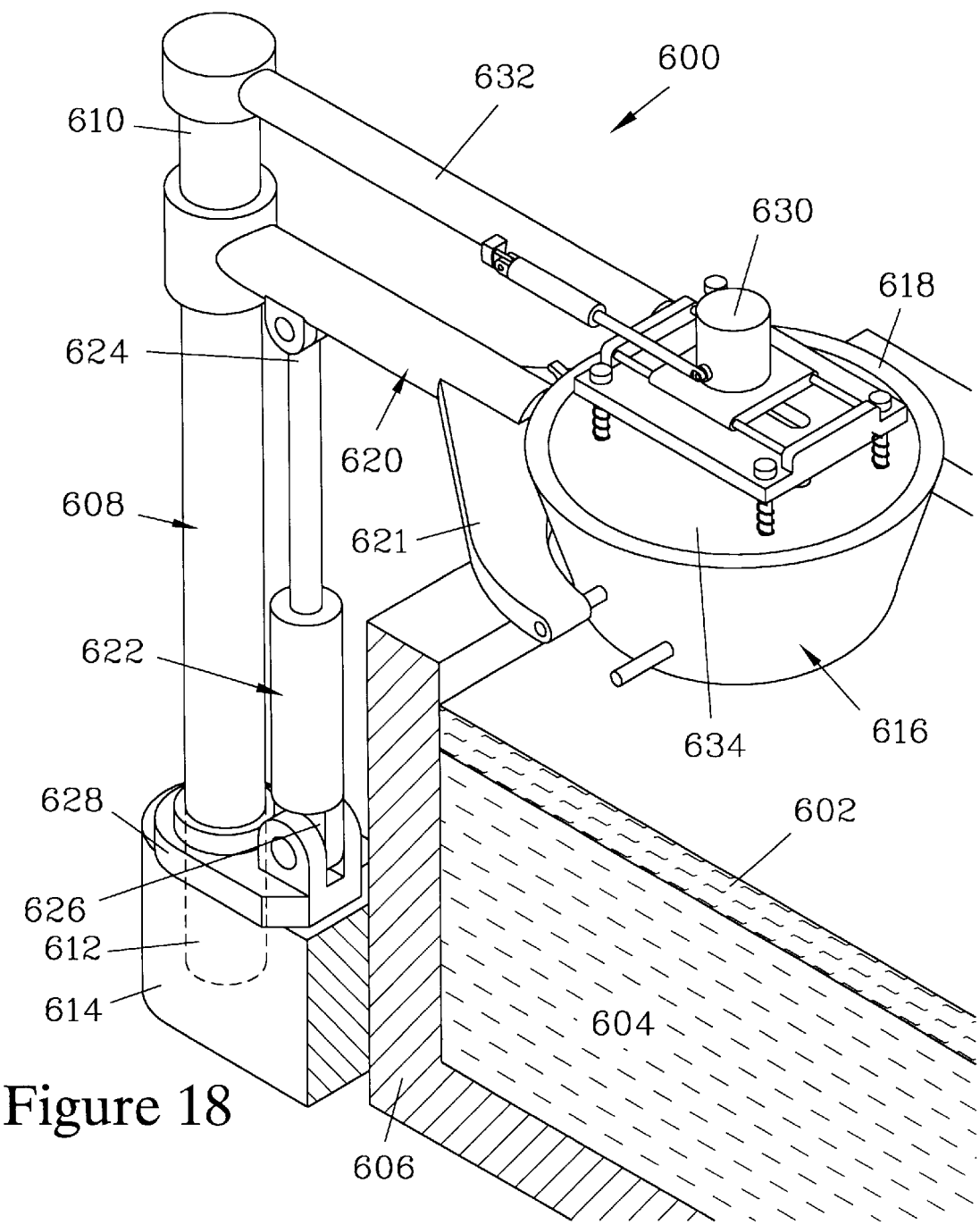
FIG. 18 is an isometric view of another embodiment, wherein the separation between the motor and the reaction vessel can be changed by raising and lowering the reaction vessel. This embodiment has particular utility when the vessel is to be swung into the furnace to drain the molten metal collected in the reaction vessel.
Figure 19:
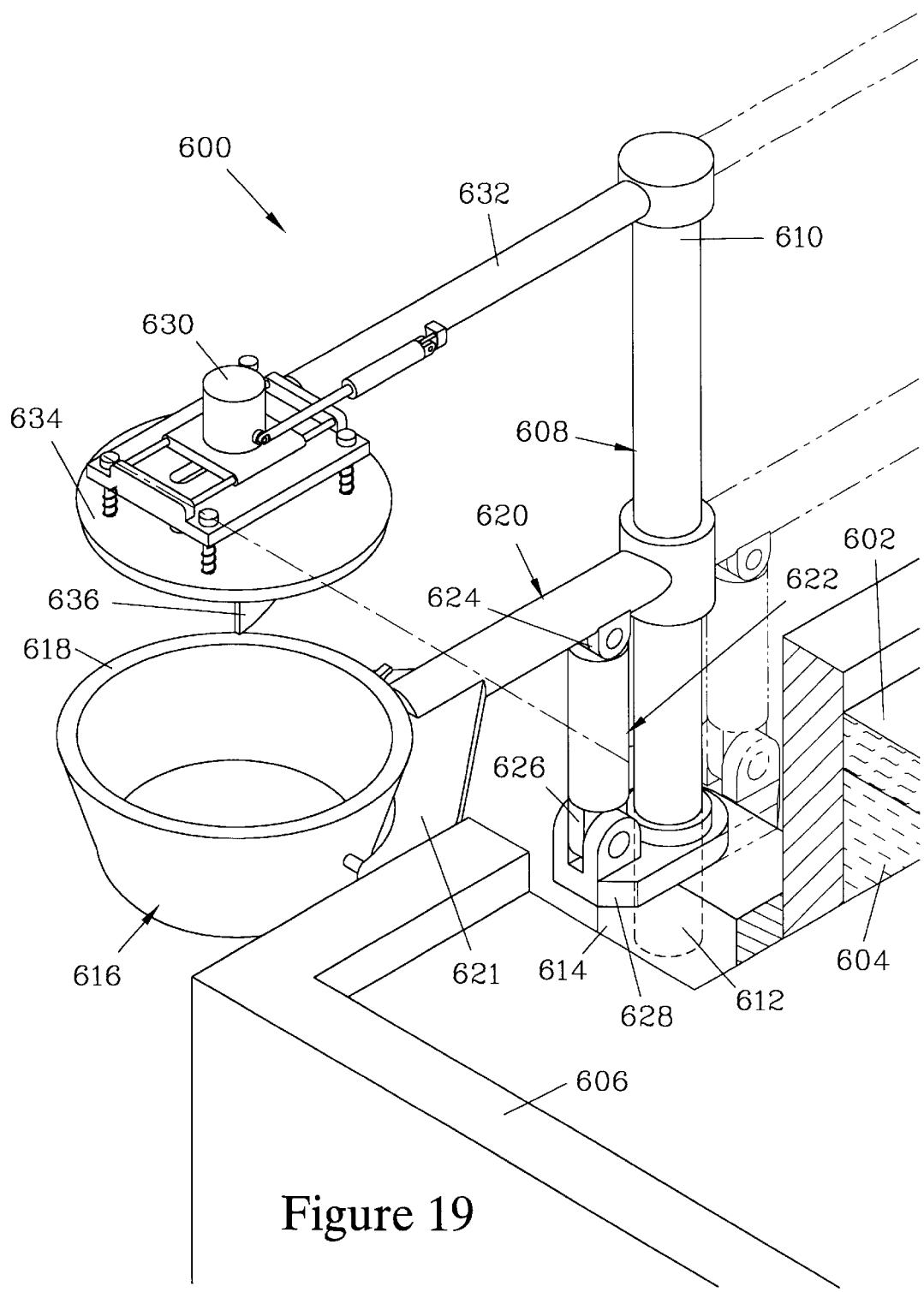
FIG. 19 is an isometric view of the same embodiment as illustrated in FIG. 18.

FIGS. 18 and 19 illustrate another embodiment of the present invention, a dross processing system 600. While the dross processing system 600 shares many features in common with the dross processing system 300 illustrated in FIG. 10, it allows easier loading of the dross to be processed, similar to that found in the embodiments shown in FIGS. 11–17. The dross processing system 600 is again employed to process dross 602 skimmed from a metal melt 604 in a furnace 606. The dross processing system 600 has a substantially vertical support 608 terminating in an upper support region 610 and a lower support region 612. A bracket 614 is provided which is attached to the furnace 606 and which engages the lower support region 612 of the substantial vertical support 608.

A reaction vessel 616 having an upper rim 618 is supported by a reaction vessel support 620, having a reaction vessel mount 621 to which the reaction vessel 616 is pivotally mounted. The reaction vessel support 620 in this embodiment is both rotatably and slidably mounted on the substantially vertical support 608, allowing the reaction vessel 616 to be raised and lowered as well as being swung to either reside over the metal melt 604 or reside outside the footprint of the furnace 606. Again, the reaction vessel 616 is preferably fabricated from stainless steel sheet stock to allow the reaction vessel 616 to be preheated when it resides over the metal melt 604.

The vertical position of the reaction vessel 616 is controlled by a linear actuator 622. The linear actuator 622 has a first actuator end 624, which engages the reaction vessel support 620, and a second actuator end 626, which is attached to a lower actuator bracket 628 which rotatably engages the lower support region 612 of the substantially vertical support 608, but which is prevented from moving axially therealong. When the linear actuator 622 is extended, as illustrated in FIG. 18, the reaction vessel 616 can be swung over the furnace 606 to reside over the metal melt 604. In this position, the reaction vessel 616 can be preheated by the metal melt 604 prior to processing the dross 602, and can drain molten metal recovered from the dross 602 directly into the metal melt 604.

When the reaction vessel 616 is swung out of the footprint of the furnace 606 and the linear actuator 622 is contracted, as shown in FIG. 19, the reaction vessel 616 is lowered such that the upper rim 618 is substantially at or below the level of the metal melt 604 to facilitate loading. If desired, a dross loading chute such as the dross loading chute 546 shown in FIG. 17 could be employed to facilitate loading the dross 602 into the reaction vessel 616. It will be understood that the linear actuator 622 is kept extended while the reaction vessel 616 resides over the furnace 606, and typically the control of the linear actuator 622 will be limited such that it can only be contracted when the reaction vessel support 620 has been fully swung away from the footprint of the furnace 606. In this embodiment, spent dross remaining in the reaction vessel 616 is dumped therefrom while the reaction vessel 616 is in the lowered position outside the footprint of the furnace 606.

A motor 630 is provided, which is similar to the motor 332 shown in FIG. 10. The motor 630 is connected to a motor arm 632 which, in this embodiment, is rotatably but not slidably mounted to the upper support region 610 of the substantially vertical support 608. The elevation of the motor 630 relative to the reaction vessel 616 is determined by the vertical position of the reaction vessel support 620. A protective shield 634 and an impeller 636 (shown in FIG. 19) are provided, which are respectively similar to the protective shield 346 and impeller 352 shown in FIG. 10.

In the dross processing system 600, the processing cycle typically begins with the reaction vessel 616 positioned over the metal melt 604 (as shown in FIG. 18) to preheat the reaction vessel 616. The reaction vessel support 620 is then swung about the substantially vertical support 608 to a position away from the furnace 606, and the linear actuator 622 is contracted to lower the reaction vessel 616 to the lowered position shown in FIG. 19. This lowers the reaction vessel 616 to a level close to that of the dross 602, facilitating loading of the dross into the reaction vessel 616, and also lowers the reaction vessel 616 away from the motor 630.

After the dross and any exothermic flux is loaded into the reaction vessel 616, the linear actuator 622 is extended to raise the reaction vessel 616 to bring the upper rim 618 into contact with the protective shield 634. This also brings the dross in the reaction vessel 616 into contact with the impeller 636, allowing the impeller 636 to stir the dross to promote coalescence of metal droplets. Preferably, the reaction vessel 616 is swung to a position over the metal melt 604 during stirring to prevent premature cooling of the dross.

When the desired stirring and reaction cycle is completed, if not already done, the reaction vessel 616 is moved to a position over the metal melt 604, and metal collected in the reaction vessel 616 is drained into the metal melt 604 by knocking out the plug (not shown) in the reaction vessel 616. Since access to the plug from above may be problematic, it is preferred to use an L-shaped prod such as the L-shaped prod 45 shown in FIG. 2 to raise the plug out of the passage in which it resides from beneath. To allow easier access to the plug, it may be desirable to only partially position the reaction vessel 616 over the metal melt 604, just sufficiently that the recovered metal drains into the metal melt 604. The reaction vessel 616 is then swung away from the furnace 606 again, and the linear actuator 622 is contracted to bring the reaction vessel 616 to its lowered position. The spent dross in the reaction vessel 616 is then dumped therefrom. The reaction vessel 616 may then be prepared for another cycle and used immediately, stored in place, or returned to its position over the metal melt 604 for use at a later time. Depending on the arrangement of the furnace site, it may be desirable to dump the spent dross or store the reaction vessel 616 at a location other than the loading position, such as the position away from the furnace shown in phantom in FIG. 19.

While the novel features of the present invention have been described in terms of particular embodiments and preferred applications, it should be appreciated by one skilled in the art that substitution of materials and modification of details obviously can be made without departing from the spirit of the invention.

What I claim is:

1. An in situ dross processing system for removing metal from dross skimmed from a metal melt of a metal melting furnace having a footprint, the dross processing system comprising:
   a substantially vertical support terminating in an upper support region and a lower support region;
   means for positioning said substantially vertical support in close proximity with respect to the furnace;
   a reaction vessel having an upper rim and a bottom terminating in a sealable port;
   a reaction vessel support for supporting said reaction vessel with respect to said substantially vertical support, said reaction vessel being pivotably mounted with respect to said reaction vessel support;
   means for retaining said reaction vessel in a horizontal position where said upper rim is substantially horizontal;
   means for pivoting said reaction vessel to a dump position where material residing in said reaction vessel is free to fall out;
   a motor having a drive shaft with a free end;
   a motor arm on which said motor is mounted, said motor arm being adjustably mounted with respect to said substantially vertical support;
   means for displacing said motor with respect to said reaction vessel between a raised position and at least one lowered position; and
   an impeller attached to said free end of said drive shaft so as to be driven by said motor during a stirring cycle, said impeller being positioned on said drive shaft such that, when said motor is in said raised position said impeller resides above said reaction vessel, and when said motor is in said at least one lowered position and aligned with said reaction vessel, said impeller resides below said upper rim of said reaction vessel,
      whereby said impeller stirs the dross retained in said reaction vessel.

2. The in situ dross processing system of claim 1 wherein said motor arm is rotatably mounted with respect to said substantially vertical support such that said motor can be rotated with respect to said reaction vessel.

3. The in situ dross processing system of claim 2 wherein said reaction vessel further comprises:
   a substantially vertical sidewall terminating at said upper rim and a lower rim;
   a bottom member attaching to said lower rim and forming a concave surface when viewed from said substantially vertical sidewall; and
   a cylindrical sleeve passing through said bottom member and serving as said port in said reaction vessel.

4. The in situ dross processing system of claim 3 wherein said reaction vessel further comprises:
   a plug support plate positionable below said port; and
   a plate support rack attached to said bottom member and configured to maintain said plug support plate beneath said port.

5. The in situ dross processing system of claim 3 wherein said means for positioning said substantially vertical support in close proximity with respect to the furnace further comprises:
   a bracket affixed with respect to the furnace for accepting said substantially vertical support; and
   further wherein said reaction vessel support is rotatably mounted with respect to the furnace such that said reaction vessel can be rotated between a first position, where said reaction vessel resides above the metal melt, and a second position, where said reaction vessel is positioned outside the footprint of the furnace.

6. The in situ dross processing system of claim 3 wherein said means for positioning said substantially vertical support in close proximity with respect to the furnace further comprises:
   a stand for positioning in close proximity to the furnace, said stand accepting said substantially vertical support; and
   further wherein said reaction vessel support is rotatably mounted with respect to the furnace such that the said reaction vessel can be rotated between a first position, where said reaction vessel resides above the metal melt, and a second position, where said reaction vessel is positioned outside the footprint of the furnace.

7. The in situ dross processing system of claim 4 wherein said motor arm has a protective shield mounted with respect thereto, said protective shield being configured to engage said upper rim of said reaction vessel.

8. The in situ dross processing system of claim 6 further comprising:
   means for providing lateral motion of said impeller when in said reaction vessel.

9. The in situ dross processing system of claim 1 wherein said means for displacing said motor with respect to said reaction vessel further comprises:
   a pivotal mount between said motor and said substantially vertical support.

10. The in situ dross processing system claim 1 further comprising:
   a spent dross receptacle, said spent dross-receptacle having,
      a receptacle bottom,
      a sidewall terminating at said receptacle bottom;
      a pair of channels having passages sufficient to accommodate lifting forks, said pair of channels being pivotably mounted to said sidewall in an opposing relationship, and
      means for locking said pair of channels with respect to said sidewall such that said passages are maintained substantially horizontal.

11. The in situ dross processing system of claim 1 wherein means for positioning said substantially vertical support further comprises:
   a translatable stand having a platform to which said substantially vertical support is mounted.

12. The in situ dross processing system of claim 11 wherein said reaction vessel further comprises:
   a substantially vertical inner sidewall terminating at said upper rim and an inner lower rim;
   an inner bottom member attaching to said inner lower rim and forming a concave surface when viewed from said substantially vertical inner sidewall;
   a substantially vertical outer sidewall terminating at said upper rim and an outer lower rim and being attached to said upper rim so as to be spaced apart from said substantially vertical inner sidewall;
   an outer bottom member attaching to said outer lower rim and forming a concave surface when viewed from said substantially vertical outer sidewall,
      said inner lower rim and said outer lower rim being so positioned as to maintain said inner bottom member and said outer bottom member in a spaced apart relationship; and
   a cylindrical sleeve passing through said inner bottom member and said outer bottom member, forming a port in said reaction vessel.

13. A reaction vessel for use in a dross processing system for removing metal from dross skimmed from a metal melt of a metal melting furnace, the reaction vessel further comprising:
   an upper rim;
   a first substantially vertical sidewall terminating at said upper rim and a first lower rim;
   a first bottom member attaching to said first lower rim and forming a concave surface when viewed from said first substantially vertical sidewall; and
   a cylindrical sleeve passing through said first bottom member, forming a port in the reaction vessel configured to accept a plug;
   a plug support plate positionable below said port; and
   a plate support rack attached to said first bottom member and configured to maintain said plug support plate beneath said port to support a plug placed in said port.

14. A reaction vessel for use in a dross processing system for removing metal from dross skimmed from a metal melt of a metal melting furnace, the reaction vessel comprising:
   an upper rim;
   a first substantially vertical sidewall terminating at said upper rim and a first lower rim;
   a first bottom member attaching to said first lower rim and forming a concave surface when viewed from said first substantially vertical sidewall;
   a second substantially vertical sidewall terminating at said upper rim and a second lower rim so as to be spaced apart from said first substantially vertical sidewall;
   a second bottom member attaching to said second lower rim and forming a concave surface when viewed from said second substantially vertical sidewall,
      said first lower rim and said second lower rim being so positioned as to maintain said first bottom member and said second bottom member in a spaced apart relationship; and
   a cylindrical sleeve passing through said first bottom member and said second bottom member, forming a port in the reaction vessel.

15. The reaction vessel of claim 14 further comprising:
   a plug support plate positionable below said port; and
   a plate support rack attached to said second bottom member and configured to maintain said plug support plate beneath said port.

16. The reaction vessel of claim 13 wherein the reaction vessel is designed for use processing aluminum drosses, further wherein said first substantially vertical sidewall and said first bottom member are fabricated from stainless steel sheet stock to which an insulating wash coating is applied, said insulating wash coating reacting with dross and molten aluminum loaded into the reaction vessel to form a chemically passive surface on said first substantially vertical sidewall and said first bottom member.

17. An in situ dross processing system for removing metal from dross skimmed from a metal melt of a metal melting furnace having a footprint, the dross processing system comprising:
   a substantially vertical support terminating in an upper support region and a lower support region;
   means for positioning said substantially vertical support in close proximity with respect to the furnace;
   a reaction vessel having an upper rim and a bottom terminating in a sealable port;
   a reaction vessel support for supporting said reaction vessel with respect to said substantially vertical support, said reaction vessel support being rotatably mounted with respect to the furnace such that said reaction vessel can be rotated between a first position, where said reaction vessel resides above the metal melt, to a second position, where said reaction vessel is positioned outside the footprint of the furnace, said reaction vessel being pivotably mounted with respect to said reaction vessel support;
   means for retaining said reaction vessel in a horizontal position where said upper rim is substantially horizontal;
   means for pivoting said reaction vessel to a dump position where material residing in said reaction vessel is free to fall out.

18. The in situ dross processing system of claim 17 further comprising:
   means for raising and lowering said reaction vessel.

19. The in situ dross processing system of claim 18 further comprising:
- a motor having a drive shaft with a free end;
- a motor arm on which said motor is mounted to position said motor with respect to said substantially vertical support;
- means for displacing said motor with respect to said reaction vessel between a raised position and at least one lowered position; and
- an impeller attached to said free end of said drive shaft so as to be driven by said motor during a stirring cycle, said impeller being positioned on said drive shaft such that, when said motor is in said raised position said impeller resides above said reaction vessel, and when said motor is in said at least one lowered position and aligned with said reaction vessel, said impeller resides below said upper rim of said reaction vessel,
- whereby said impeller stirs the dross retained in said reaction vessel.

20. The reaction vessel of claim 14 wherein the reaction vessel is designed for use processing aluminum drosses, further wherein said first substantially vertical sidewall and said first bottom member are fabricated from stainless steel sheet stock to which an insulating wash coating is applied, said insulating wash coating reacting with dross and molten aluminum loaded into the reaction vessel to form a chemically passive surface on said first substantially vertical sidewall and said first bottom member.

* * * * *